(12) United States Patent
Vlutters et al.

(10) Patent No.: US 8,755,561 B2
(45) Date of Patent: Jun. 17, 2014

(54) METHOD AND SYSTEM FOR 2D DETECTION OF LOCALIZED LIGHT CONTRIBUTIONS

(75) Inventors: Ruud Vlutters, Eindhoven (NL); Frederik Jan De Bruijn, Eindhoven (NL); Lorenzo Feri, Eindhoven (NL); Tim Corneel Wilhelmus Schenk, Eindhoven (NL); Remco Theodorus Johannes Muijs, Meteren (NL)

(73) Assignee: Koninklijke Philips N.V., Eindhoven (NL)

( * ) Notice: Subject to any disclaimer, the term of this patent is extended or adjusted under 35 U.S.C. 154(b) by 150 days.

(21) Appl. No.: 13/520,588

(22) PCT Filed: Jan. 11, 2011

(86) PCT No.: PCT/IB2011/050116
§ 371 (c)(1),
(2), (4) Date: Jul. 5, 2012

(87) PCT Pub. No.: WO2011/086501
PCT Pub. Date: Jul. 21, 2011

(65) Prior Publication Data
US 2012/0281879 A1 Nov. 8, 2012

(30) Foreign Application Priority Data

Jan. 15, 2010 (EP) .................................. 10150849

(51) Int. Cl.
*G06K 9/00* (2006.01)
(52) U.S. Cl.
USPC .............................. 382/100; 713/176; 362/16
(58) Field of Classification Search
USPC .................. 382/100, 181, 190, 191, 232, 274; 380/54, 210, 252, 287; 713/176; 704/200.1, 273; 381/73.1; 348/460, 348/463; 362/11.16

See application file for complete search history.

(56) References Cited

U.S. PATENT DOCUMENTS

| 3,814,904 | A  | * | 6/1974  | Russell et al. | 250/369 |
|-----------|----|---|---------|----------------|---------|
| 6,286,969 | B1 | * | 9/2001  | Kurokawa et al.| 362/11  |
| 6,636,646 | B1 | * | 10/2003 | Gindele        | 382/274 |
| 7,633,406 | B2 | * | 12/2009 | Miki           | 340/9.1 |
| 8,315,461 | B2 | * | 11/2012 | Free           | 382/181 |
| 8,406,561 | B2 | * | 3/2013  | Hadap et al.   | 382/274 |
| 8,463,072 | B2 | * | 6/2013  | Hadap et al.   | 382/286 |

(Continued)

FOREIGN PATENT DOCUMENTS

WO 2009010926 A2 1/2009
WO 2009136309 A2 11/2009

*Primary Examiner* — Anand Bhatnagar
(74) *Attorney, Agent, or Firm* — Yuliya Mathis

(57) ABSTRACT

The invention relates to a detection system for determining whether a light contribution of a light source is present at a selected position within a 2D scene. The light contribution includes an embedded code comprising a repeating sequence of N symbols. The detection system includes a camera and a processing unit. The camera is configured to acquire a series of images of the scene via specific open/closure patterns of the shutter. Each image includes a plurality of pixels, each pixel representing an intensity of the light output of the light source at a different physical position within the scene. The processing unit is configured to process the acquired series of images to determine whether the light contribution of the first light source is present at the selected physical position within the scene by e.g. correlating a sequence of pixels of the acquired series corresponding to the selected physical position with the first sequence of N symbols.

14 Claims, 18 Drawing Sheets

(56) References Cited

U.S. PATENT DOCUMENTS

| | | | |
|---|---|---|---|
| 8,593,073 B2 * | 11/2013 | Aldrich et al. | 315/291 |
| 2004/0160199 A1 * | 8/2004 | Morgan et al. | 315/312 |
| 2007/0291483 A1 * | 12/2007 | Lys | 362/227 |
| 2009/0027511 A1 | 1/2009 | Kouno | |
| 2009/0110322 A1 * | 4/2009 | Hadap et al. | 382/274 |
| 2010/0079481 A1 * | 4/2010 | Zhang et al. | 345/595 |
| 2011/0182520 A1 * | 7/2011 | Free | 382/195 |

\* cited by examiner

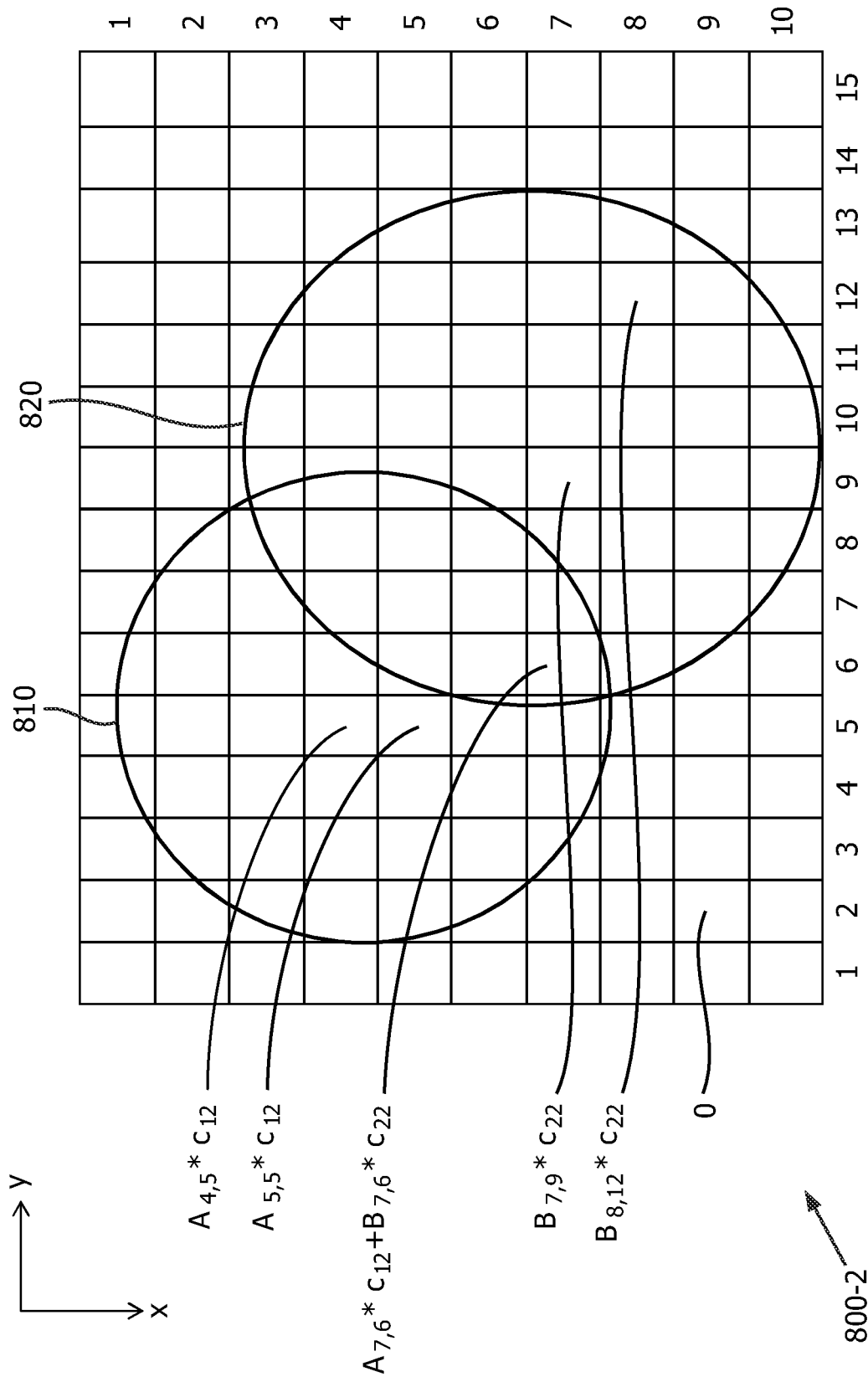

METHOD AND SYSTEM FOR 2D DETECTION OF LOCALIZED LIGHT CONTRIBUTIONS

FIELD OF THE INVENTION

Embodiments of the present invention relate generally to the field of illumination systems and optical receivers, and, more specifically, to systems and methods for detecting data embedded into the light output of such illumination systems.

BACKGROUND OF THE INVENTION

In recent years, highly advanced illumination systems are being developed that allow consumers to obtain a desired ambiance for a particular room or space. These illumination systems move away from the traditional control of individual light sources (switching on/off and dimming) towards scene setting, where sets of light sources are controlled simultaneously. An example of such an illumination system is an arrangement of several sets of light sources in a room, a lobby, or a vehicle.

For these scene setting applications, intuitive user interaction is identified as one of the most important success factors. Providing a user with information related to the light sources, such as localized identification of the light sources, their capabilities, and there current settings, is key for enabling an intuitive interaction. One technique that has been proposed to provide the user with such information is based on embedding codes (also referred to as "identifiers") identifying a light source or a group of light sources by modulating the light output of the illumination device in a manner so that the embedded codes are invisible to the consumers (such light output is sometimes referred to as "coded light" and abbreviated as "CL"). The embedded codes are detected by an optical receiver which may, for example, be implemented in a remote control for controlling the illumination devices or included in another unit such as a switch or a sensor device.

It has been previously shown how CL technology can be used for commissioning of lighting systems, e.g. by pointing to individual light sources and reading out their identifiers. Also, user interaction methods based on this technology have been developed, e.g. interactive scene setting using a photo sensor based receiver, and point-and-control based light source selection using a small array of photo detectors.

A drawback of the previous CL detection techniques is that only embedded codes present at single positions can be detected. In contrast, it is desired to characterize the whole two-dimensional (2D) scene in real time in terms of the identifiers being present, distinguishing the identifiers of the different light sources in a room/scene.

To eliminate this drawback, camera sensors have been proposed that can determine embedded codes present at multiple positions within an image. However, a drawback of the previous techniques employing camera sensors is that the acquisition time of the sensor must be equal to the duration of a single bit within the embedded code. Consecutive bits of the embedded code are then detected by analyzing results obtained in consecutive acquisitions of the camera. When CL is embedded in a manner that is invisible to a human eye (i.e., embedded at high frequency), such techniques require the use of advanced and, therefore, expensive cameras capable of providing high acquisition rate. Conventional low-cost camera sensors typically have too low of an acquisition rate to detect such high frequency CL. Therefore, currently, the only methods for CL detection that can work with conventional low-cost cameras require the identifiers to be embedded in such a manner that the CL modulation cannot be completely invisible because the viewers can visually perceive the low frequency modulation as flickering in the light.

As the foregoing illustrates, what is needed in the art is a technique for detecting CL embedded into a light output of light sources that addresses at least some of the problems described above.

SUMMARY OF THE INVENTION

It is an object of the invention to provide a detection system and a method capable of detecting 2D CL embedded into a light output of light sources in a manner that allows identification of the embedded codes of the different light sources being present in a 2D scene. It is a further object of the invention to provide a detection system and method suitable for detecting the invisible "high frequency" CL while using less expensive cameras as those used in the previous techniques.

One embodiment of the present invention sets forth a detection system for determining whether a light contribution of a first light source of an illumination system is present at a selected position within a scene. The light contribution of the first light source includes a first embedded code comprising a repeating first sequence of N symbols. The detection system includes a camera configured to acquire a series of images of the scene and a processing unit configured to process the acquired series of images. Each acquired image includes a plurality of pixels, each pixel representing an intensity of a total light output of the illumination system at a different physical position within the scene. The total light output of the illumination system comprises at least the light contribution of the first light source. The series comprises at least N different images, where each image of the at least N different images is acquired with a total exposure time comprising one or more exposure instances at different temporal positions within the repeating first sequence of N symbols. The processing unit is configured to process the acquired series of images to determine whether the light contribution of the first light source is present at the selected physical position.

Such a detection system may be implemented, for example, in a remote control for controlling the illumination system or included in another unit such as a switch or a sensor device. The processing unit may be implemented in hardware, in software, or as a hybrid solution having both hardware and software components.

Moreover, a corresponding method and a computer program for determining whether a light contribution of a first light source of an illumination system is present at a selected position within a scene are provided. A computer program may, for example, be downloaded to the existing detection systems (e.g. to the existing optical receivers) or be stored upon manufacturing of the detection systems.

Another embodiment of the present invention sets forth an alternative implementation of a detection system for determining whether a light contribution of a first light source of an illumination system is present within a first part of a scene. Again, the light contribution of the first light source includes a first embedded code comprising a repeating first sequence of N symbols and the detection system includes a camera configured to acquire a series of images of the scene, as described above. The detection system further includes a processing unit. The processing unit is configured to, for each acquired image, determine a sum of the pixels included in a part of the image corresponding to the first part of the scene. The processing unit is also configured to correlate a sequence of the sums of the acquired series of images with the first sequence of N symbols and to determine that the light contribution of the first light source is present within the first part of the scene when the correlation of the sequence of the image sums of the acquired series of images with the first sequence of N symbols produces at least one correlation peak above a first threshold value.

A method corresponding to this alternative implementation of the detection system is provided as well.

As used herein, the term "pixel" [of an image] refers to a unit of image data corresponding to a particular point within a scene. Image data comprises intensities (or derivatives thereof) of the total light output of the illumination system at different points within the scene. Arranging image data in rows and columns of pixels is one way of representing the three-dimensional (3D) scene in a 2D image.

Further, as used herein, the term "peak" in a correlation output refers to the peak that is significantly higher than all of the other peaks. While correlation outputs typically include a number of peaks of various heights, including a number of small peaks, differentiating which peak is the one of interest for analyzing the correlation output does not typically present difficulties for the persons skilled in the art. Therefore, only those peaks that are relevant for determining the presence of the embedded code are referred to herein as "peaks" and the smaller, irrelevant peaks are referred to as "subpeaks."

The time duration of a repeating sequence of the embedded code (or, alternatively, the length of the repeating sequence of the embedded code measured in the number of binary values comprising the sequence) is referred to herein as a "code period." A particular code is embedded into the light output of a light source by modulating the drive signal applied to the light source via binary modulation or multilevel modulation using pulse width modulation, pulse density modulation, or amplitude modulation, as known in the art. As used herein, the term "drive signal" refers to an electrical signal that, when applied to a light source, causes the light source to generate light output. Preferably, the code is embedded in the light output in such a manner that a human eye cannot distinguish between a light output that includes the embedded code and a light output that does not. This may be achieved by e.g. modulating the drive signal applied to the first light source at a high frequency.

The gist of the present invention resides in recognizing that by capturing a series of images of the same scene that differ only in the relative times when each image is acquired within the repeating sequence (such times are referred to herein as "exposure instances") and selecting the temporal positions and the durations of the exposure instances within the frame time of the camera to be corresponding to particular code bits of the encoded light, presence or absence of a particular sequence of code bits may be detected for any particular physical position within the scene. The presence or absence of a particular sequence indicates presence or absence of a light contribution of a light source carrying the encoded light of that sequence. The sum of the durations of all exposure instances within a frame is referred to as the "exposure time" of the camera. The desired exposure time at particular exposure instances may be implemented by opening and closing a shutter of the camera, where the shutter can be either internal of external to the camera. The exposure time remains the same for all of the images while varying when the shutter is open within the frame time (i.e., while varying the temporal positions of the exposure instances within the frame time). For example, for a frame time of a camera set to 20 milliseconds (ms) and an exposure time set to 5 ms, one image may be acquired when the shutter is open only for the first 5 ms of the frame (i.e., the shutter is closed for the last 15 ms of the frame), another image may be acquired when the shutter is only open for the last 5 ms of the frame (i.e., the shutter is closed for the first 15 ms of the frame), yet another image may be acquired when the shutter is open for the first millisecond of the frame, then closed for a millisecond, then open another millisecond, then closed again for a millisecond, then open again for 3 ms, and then closed for the remainder of the frame time.

Taking a series of images in this manner allows determining presence of light contribution of a particular light source at any particular position within a 2D scene. Thus, embedded codes present at different positions within the 2D scene may be detected in real time with a single series of images. Furthermore, by carefully triggering when the shutter of the camera is open to capture the different code bits of the encoded light within each frame time of a camera, a conventional camera with a relatively long frame time may be employed. Therefore, the techniques presented herein are suitable for detecting the invisible "high frequency" CL while using less expensive cameras as those used in the prior art.

The light sources described herein may comprise high/low pressure gas discharge sources, inorganic/organic light emitting diodes, laser diodes, incandescent sources, or halogen sources. Data embedded in the light output of the illumination system may comprise localized identification of the light sources, their capabilities and current settings, or other types of information related to the light sources. However, it should be noted that the illumination system is not necessarily applied for the purpose of illuminating a space or area but may also be applied for data communication as such. As an example, the illumination system may constitute an access point to a network. For such applications, at least part of the light output produced by the illumination system may lie outside of the visible spectrum (i.e., the light output of one of the light sources of the system may lie outside of the visible spectrum).

The embodiment of claims 2 and 13 specify that the processing of the acquired series of images may advantageously comprise correlating a sequence of pixels of the acquired series of images corresponding to the selected physical position with the first sequence of N symbols and determining that the light contribution of the first light source is present at the selected physical position when the correlation of the sequence of pixels of the acquired series of images corresponding to the selected physical position with the first sequence of N symbols produces a correlation peak.

The embodiment of claim 3 provides that correlating the sequence of pixels of the acquired series of images corresponding to the selected physical position within the scene allows not only determining whether the light contribution of the first light source is present at that position, but also determining the intensity magnitude of the light contribution of the first light source at that position.

The embodiment of claim 4 advantageously allows determining the light contribution of a second light source using the same series of acquired images as for the first light source. The first and second light sources may either operate synchronously (i.e., the code embedded into the light output of one light source begins at the same time as the code embedded into the light output of the other light source) or asynchronously (i.e., the code embedded into the light output of one light source begins at a different time than the code embedded into the light output of the other light source).

The embodiment of claim 5 specifies that the processing of the acquired series of images may further advantageously comprise correlating a sequence of pixels of the acquired series of images corresponding to the selected physical position with the second sequence of N symbols and determining that the light contribution of the second light source is present at the selected physical position when the correlation of the sequence of pixels of the acquired series of images corresponding to the selected physical position with the second sequence of N symbols produces a correlation peak.

When an image contains a large number of pixels, it may be desirable to determine whether the light contribution of a particular light source is present in a particular part of the scene at all, especially before determining the light contributions of this light source at the selected physical positions within the scene. Thus, the embodiment of claim 6 allows determining whether the light contribution of the first light source is present within a particular part of the scene (as opposed to a particular selected physical position within the scene). The processing steps of claim 6 may reduce the total processing load on the processing unit, especially when a large number of light sources may be providing their light contributions to the scene and/or when each image contains a large number of pixels. While this embodiment is particularly advantageous with an illumination system comprising multiple light sources, it could also be used in an environment where the illumination system includes only one light source.

The embodiment of claim 7 advantageously allows setting different threshold values for different light sources when the processing unit determines whether a light contribution of a particular light source is present within a particular part of the scene. The embodiment of claim 8 sets forth the duration of an exposure instance. Selecting such duration is advantageous because it allows the processing unit to resolve the individual symbols of the embedded code.

Embodiments of claims 9 and 10 provide that, when the one or more exposure instances comprise at least two exposure instances, the exposure instances may be consecutive (i.e., a single exposure) or non-consecutive (i.e., an exposure within a frame of the camera is broken up into separate exposure instances). When all exposure instances within a frame of a camera are consecutive, a shutter that is typically internal to all cameras may be used to set the correct exposure instances within the total exposure time (i.e., to set the exposure instances at the desired temporal positions within the frame time of the camera). Alternatively, the shutter that is typically internal to all cameras may be set to be open for the entire frame time of each frame, and a shutter that is external to the camera may be used to set the correct exposure instances within the total exposure time. An electronic shutter may be used for this purpose.

Hereinafter, an embodiment of the invention will be described in further detail. It should be appreciated, however, that this embodiment may not be construed as limiting the scope of protection for the present invention.

BRIEF DESCRIPTION OF THE DRAWINGS

FIG. 8b is a schematic illustration of a second image of the series of images taken when two light sources provide light contributions to a scene, according to one embodiment of the present invention;

DETAILED DESCRIPTION OF THE EMBODIMENTS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
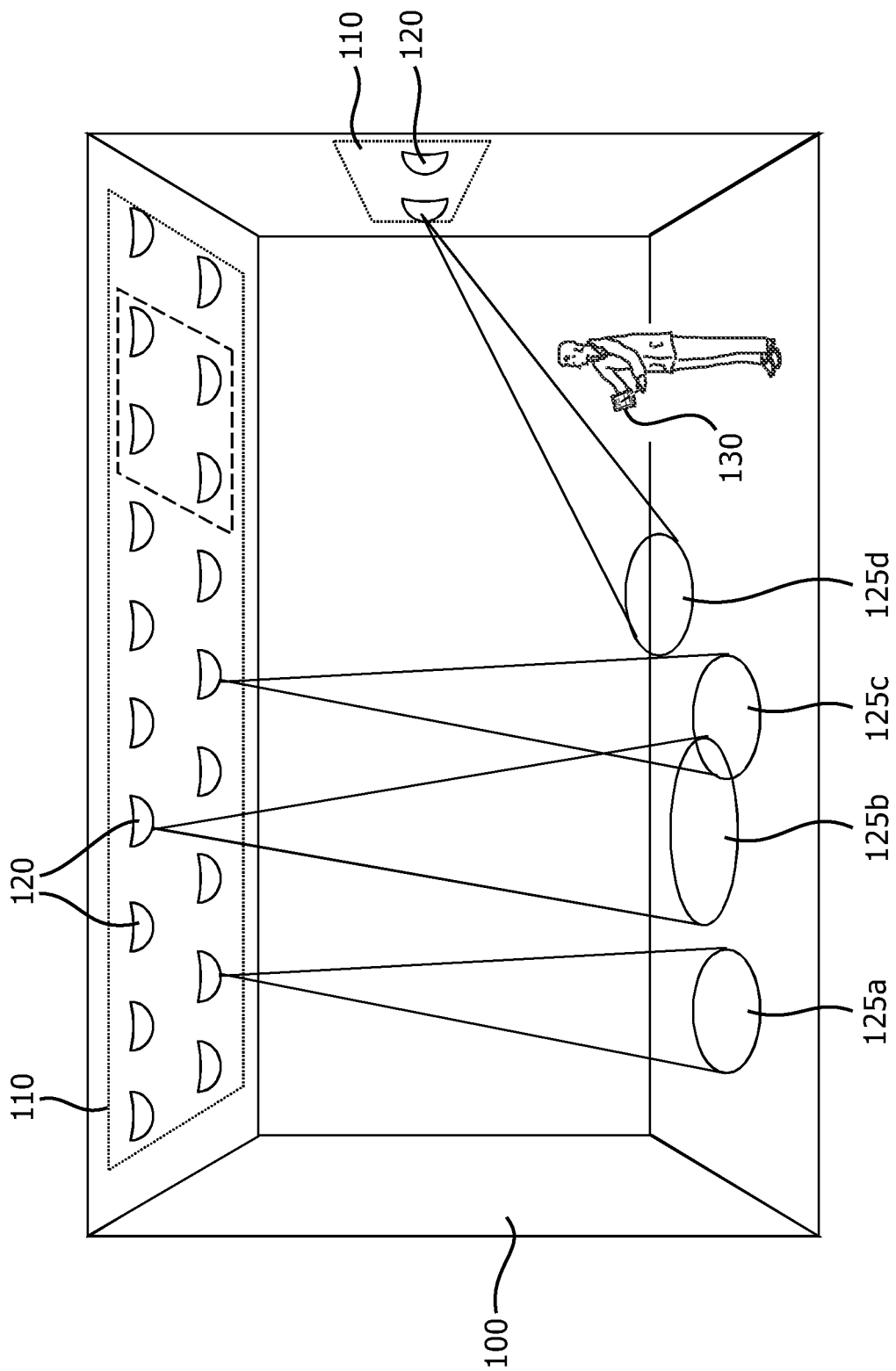
FIG. 1 is a schematic illustration of an illumination system installed in a structure according to one embodiment of the present invention.

FIG. 1 shows a structure 100—in this case a room—with an installed illumination system 110. The illumination system 110 comprises one or more of light sources 120 and one or more controllers (not shown in FIG. 1) controlling the light sources 120. When driven with an electrical signal, the light sources 120 illuminate parts of the structure 100, the illumination contributions from the various light sources 120 shown as footprints 125a-125d. The light sources 120 may comprise high/low pressure gas discharge sources, inorganic/organic light emitting diodes, laser diodes, incandescent sources, or halogen sources. The illumination system 110 may further comprise a remote control 130 allowing a user to control the light sources 120.

Figure 2:
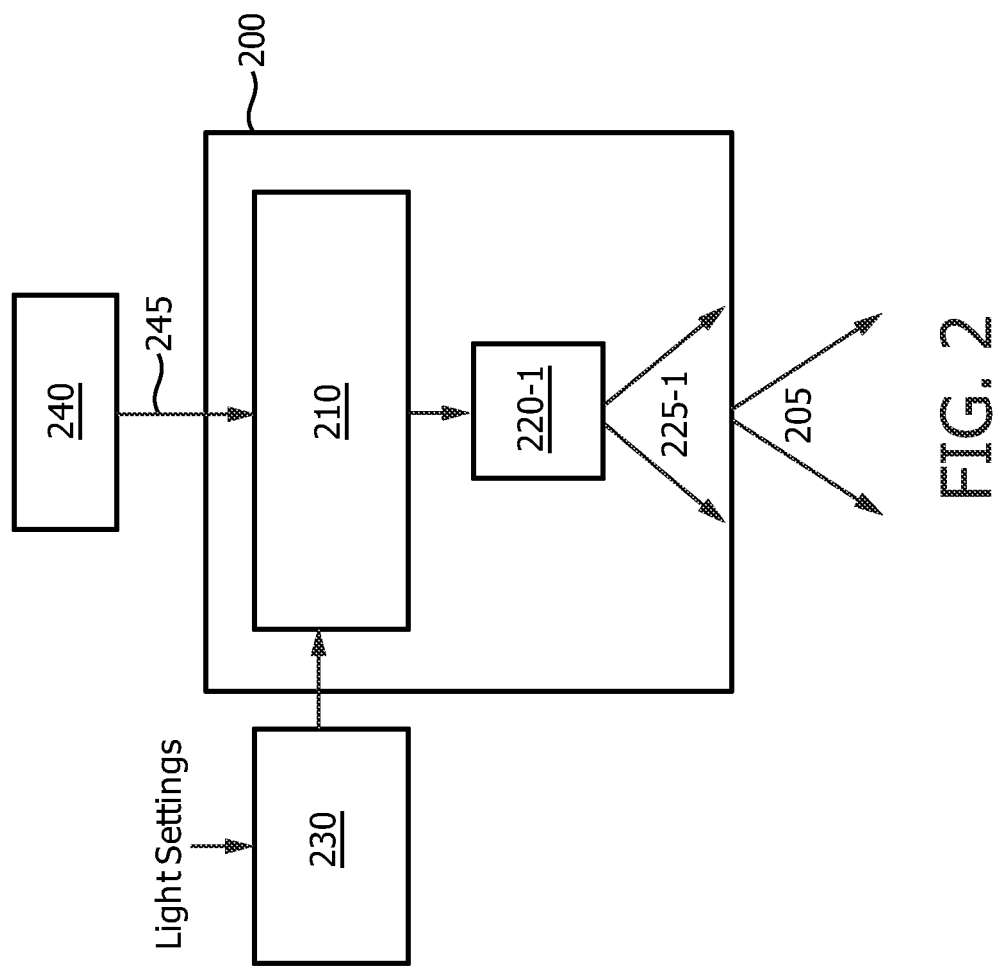
FIG. 2 is a schematic illustration of an illumination system according to one embodiment of the present invention.

FIG. 2 is a schematic illustration of an illumination system 200 according to one embodiment of the present invention. The illumination system 200 may be used as the illumination system 110 in the structure 100 illustrated in FIG. 1. As shown, the illumination system 200 includes at least a system controller 210 and a first light source 220-1, and is configured to generate a light output 205 according to light settings. In other embodiments, the illumination system may include additional light sources and, optionally, additional controllers, individually controlling each of the additional light sources. Alternatively, a single controller may be configured to control multiple light sources.

The illumination system 200 is configured to operate as follows. As shown in FIG. 2, the light settings for the illumination system 200 are provided to a drive signal generator 230 (which, optionally, may be included within the illumination system 200). The light settings indicate what the average light output 205 should be in terms, for example, of light power, e.g. defined in lumen, and color. The light settings may be provided by a user via the remote control 130 or may be preprogrammed and provided from an external unit controlling the scene setting. Alternatively, the light settings may be preprogrammed and stored in a memory within the drive signal generator 230 or within the illumination system 200. The drive signal generator 230 translates the light settings into different electrical drive signals for different light sources within the illumination system 200 and provides the drive signals to the system controller 210. In the embodiment illustrated in FIG. 2, the drive signal generator 230 translates the light settings into a first drive signal for the first light source 220-1. The system controller 210, in turn, drives the different light sources with their respective drive signals to produce the light output 205. In the embodiment illustrated in FIG. 2, the system controller 210 is configured to drive the light source 220-1 with a first drive signal to produce a light output 225-1. In this embodiment, the light output 205 of the illumination system 200 comprises the light output 225-1.

As described, the light settings indicate what the light output 205 of the illumination system 200 should be in terms, for example, of light color. The color change of the light output 205 may be achieved by differently dimming the different light sources (additional, optional, light sources not shown in FIG. 2) within the illumination system 200 via controlling the drive signals provided to the system controller 210 from the drive signal generator 230. For a constant dimming level per light source, the drive signal that is provided from the drive signal generator 230 to the system controller 210 comprises a repeated pattern of pulses. Such a repeated pattern is referred to herein as a "drive pattern."

Various methods for dimming the light sources are known to people skilled in the art and, therefore, are not described here in detail. These methods include e.g. pulse width modulation, pulse density modulation, or amplitude modulation.

Figure 3:
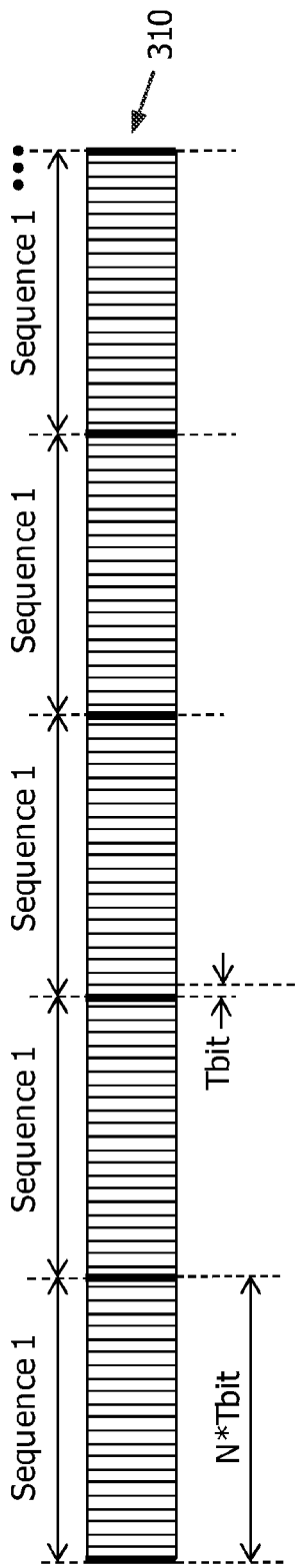
FIG. 3 is a schematic illustration of a code comprising a repeating sequence of N symbols, according to one embodiment of the present invention.

The system controller 210 is further configured to receive a signal 245 from a data source 240. The signal 245 includes (at least) a code to be embedded into the light output 225-1 of the light source 220-1. Such a code is illustrated in FIG. 3. As shown, code 310 comprises a repeating sequence of N symbols (e.g., bits), shown as "Sequence 1." In the following description, the symbols will be referred to as bits. However, it should be recognized that whenever the word "bit" is used in the present application, a wider definition of a "symbol" applies which may also comprise multiple bits represented by a single symbol. One example are multi-level symbols, where not only 0 and 1 exist to embed data, but multiple discrete levels.

Each bit of the code 310 has duration $T_{bit}$. Thus, the code period is equal to $N*T_{bit}$. The sequence may represent, for example, a localized identification of the light source 220-1, its capabilities and current light settings, or other type of information that may or may not be related to the light source 220-1 or the illumination system 200. The system controller 210 can embed the code 310 into the light output 225-1 of the light source 220-1 by modulating the drive signal to be applied to the light source 220-1 in response to the code 310. Various techniques for embedding a code into the light output of a light source are known to people skilled in the art and, therefore, are not described here in detail. The signal 245 may further include other similar codes to be embedded into the light output of the other light sources. Each of the codes includes a different repeating sequence of N bits.

Figure 4:
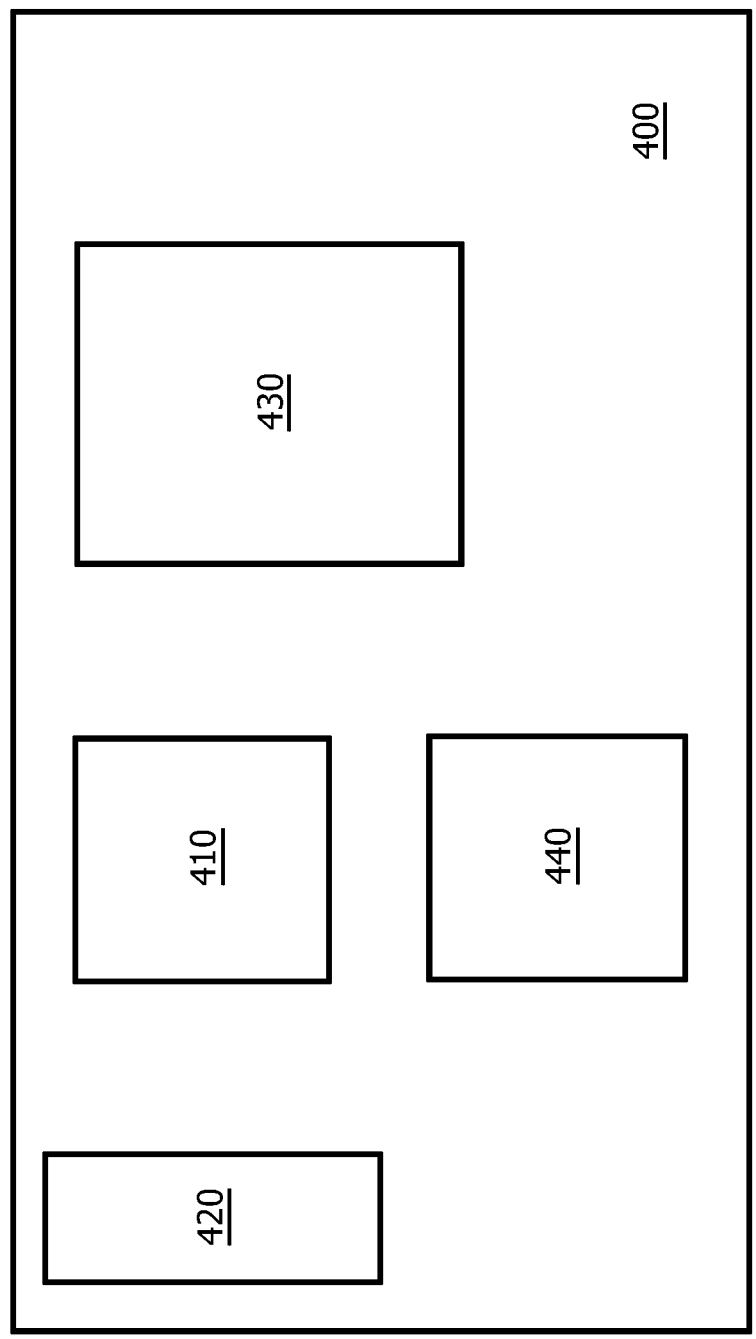
FIG. 4 is a schematic illustration of a detection system, according to one embodiment of the present invention.

FIG. 4 is a schematic illustration of a detection system 400, according to one embodiment of the present invention. As shown, the detection system 400 includes at least a camera 410, a shutter 420, and a processing unit 430. Optionally, the detection system 400 also includes a memory 440. The camera 410 is configured to acquire a series of images of a scene. The shutter 420 is configured to carefully time the instances when images are acquired by the camera 410 (images are acquired when the shutter 420 is open and images are not acquired when the shutter 420 is closed). In various embodiments, the shutter 420 may either comprise a conventional shutter internal to the camera 410 which can only open and close a single time during a frame time of the camera (i.e., a single exposure of a predetermined duration within a frame) or an electronic shutter disposed in front of the camera which can open and close multiple times during a single frame.

Depending e.g. on the resolution of the camera 410 (i.e., the number of pixels contained in each image), how many light sources are included within the illumination system 200, and whether those light sources operate synchronously or asynchronously, the processing unit 430 may be configured to implement different methods for processing the data contained in the series of acquired images to determine whether or not a light output of a particular light source is present at a particular position within a scene.

For all of the methods implemented in the detection system 400, the processing unit 430 has access to the repeating sequences contained in each of the embedded codes. In one embodiment, the illumination system 200 may directly provide this information to the processing unit 430. In another embodiment, the detection system 400 may include the memory 440 storing this information. In yet another embodiment, the detection system 400 may be configured to obtain this information from the (wirelessly) received light signals. Alternatively, the processing unit 430 may obtain, by any of the means described above, not the repeating sequences contained in each of the embedded codes themselves, but derivatives thereof (i.e., parameters from which this information may be obtained). For example, the processing unit 430 may obtain the length of a particular known sequence or an indicator number referring to one out of the set of possible sequences. The repeating sequence may then be recreated by the processing unit 430, potentially reducing the amount of communication provided to the detection system 400. In another embodiment, the parameters describing the repeating sequences may be extracted from the received light signals.

Scenario 1: One Light Source, Single-Bit Exposure Per Frame

Figure 5:
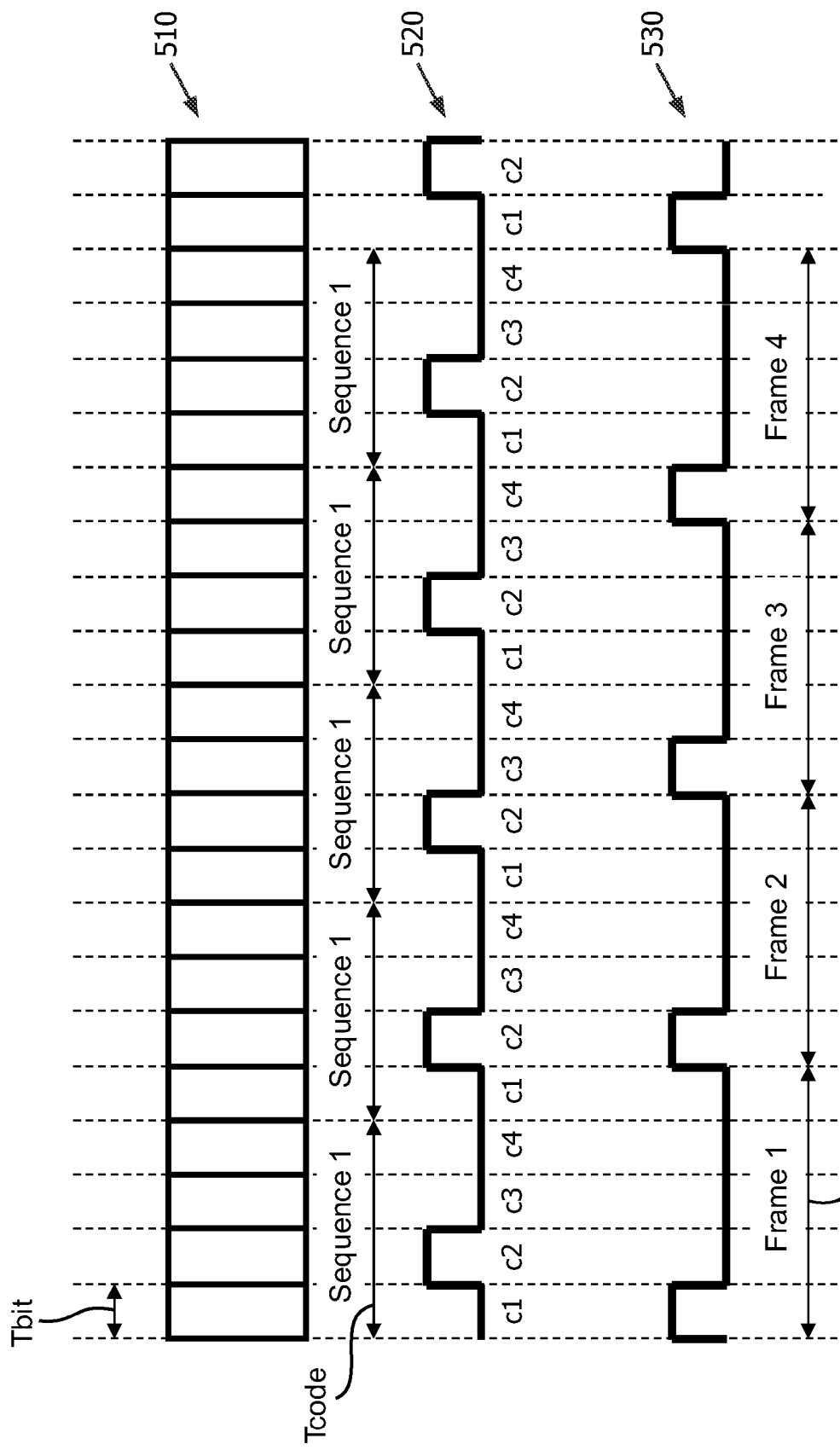
FIG. 5 provides schematic illustrations of an exemplary code comprising a repeating sequence of 4 symbols and exemplary single-bit exposure instances within the frames of the camera appropriate for such code, according to one embodiment of the present invention.

First, consider an exemplary scenario where the illumination system 200 is such that only one light source, e.g. the light source 220-1, can provide light contribution to a particular scene. Consider that the scene is a part of the floor of the structure 100, illustrated in FIG. 1, and the light source 220-1 is the one of the light sources 120 illustrated in FIG. 1 having the footprint 125a within the scene (i.e., on the floor). For simplicity, consider that the repeating sequence of the code embedded into the light output of the light source 220-1 includes only 4 bits. Such a code is shown in FIG. 5 as a code 510. As shown, each of the bits has duration $T_{bit}$. Therefore, the code period is equal to $4*T_{bit}$. Further, consider that the individual bits of the first sequence, bits $c_1$, $c_2$, $c_3$, and $c_4$, comprise 0, 1, 0, and 0, respectively, illustrated in FIG. 5 with a signal 520. The signal 520 may be included in the signal 245, described in FIG. 2.

As described above, a code is embedded into the light output of the light source 220-1 by driving the light source 220-1 with a drive signal modulated in response to the code. In various embodiments, the system controller 210 may generate the modulated drive signal by modulating the drive signal via binary or multilevel modulation using e.g. pulse width modulation (PWM), pulse position modulation, pulse density modulation, or amplitude modulation. For example, to embed a binary value of 0 from the signal 520 using PWM, the system controller 210 may make a drive pattern within the drive signal narrower by an amount a to embed a binary value of "0" from the signal 520 and the system controller 210 may make another drive pattern within the drive signal wider by an amount b to embed a binary value of "1" from the signal 520. By making the ratio between the amount a and the amount b equal to the ratio between the number of 1's and 0's in the signal 520, embedding data in the light output of the illumination system may be made invisible for the human eye because the time average of the modulated drive signal remains the same as that of the original drive signal. Persons skilled in the art will recognize other methods for modulating the drive signal in dependence of the signal 520 to embed data into light output of the illumination system.

Further assume that the detection system 400 may already contain or may obtain the code embedded into the light output of the light source 220-1.

In such a scenario, the detection system 400 may be configured to operate in the following manner in order to determine whether the light output of the light source 220-1 is present at any selected position within the scene. First, the camera 410 is configured to acquire a series of images of the scene.

To that end, the frame time of the camera may be set to be one bit greater than the code period, i.e. $5*T_{bit}$, and the exposure of the camera may be set to comprise a single exposure instance having duration equal to the duration of one bit of the code period, i.e. $T_{bit}$. Further, the camera 410 may be configured to acquire an image during the first time period $T_{bit}$ of each frame. The exposure of the camera 410 configured in this manner is illustrated in FIG. 5 with a line 530.

When an image is taken, the camera acquires intensities of the total light output of the illumination system at all of the positions within a scene. In the present application, whenever the term "intensity" (of the light output) is used, it is understood that a "derivative of the intensity" is included as well, such as e.g. the light color, color temperature, light spectrum, and change in light intensity. The image is commonly divided into a plurality of pixels, where each pixel represents an intensity of the total light output of the illumination system at a different physical position within the scene. In the current scenario, the total light output of the illumination system may comprise only the light contribution from the light source 220-1.

Figure 6A:
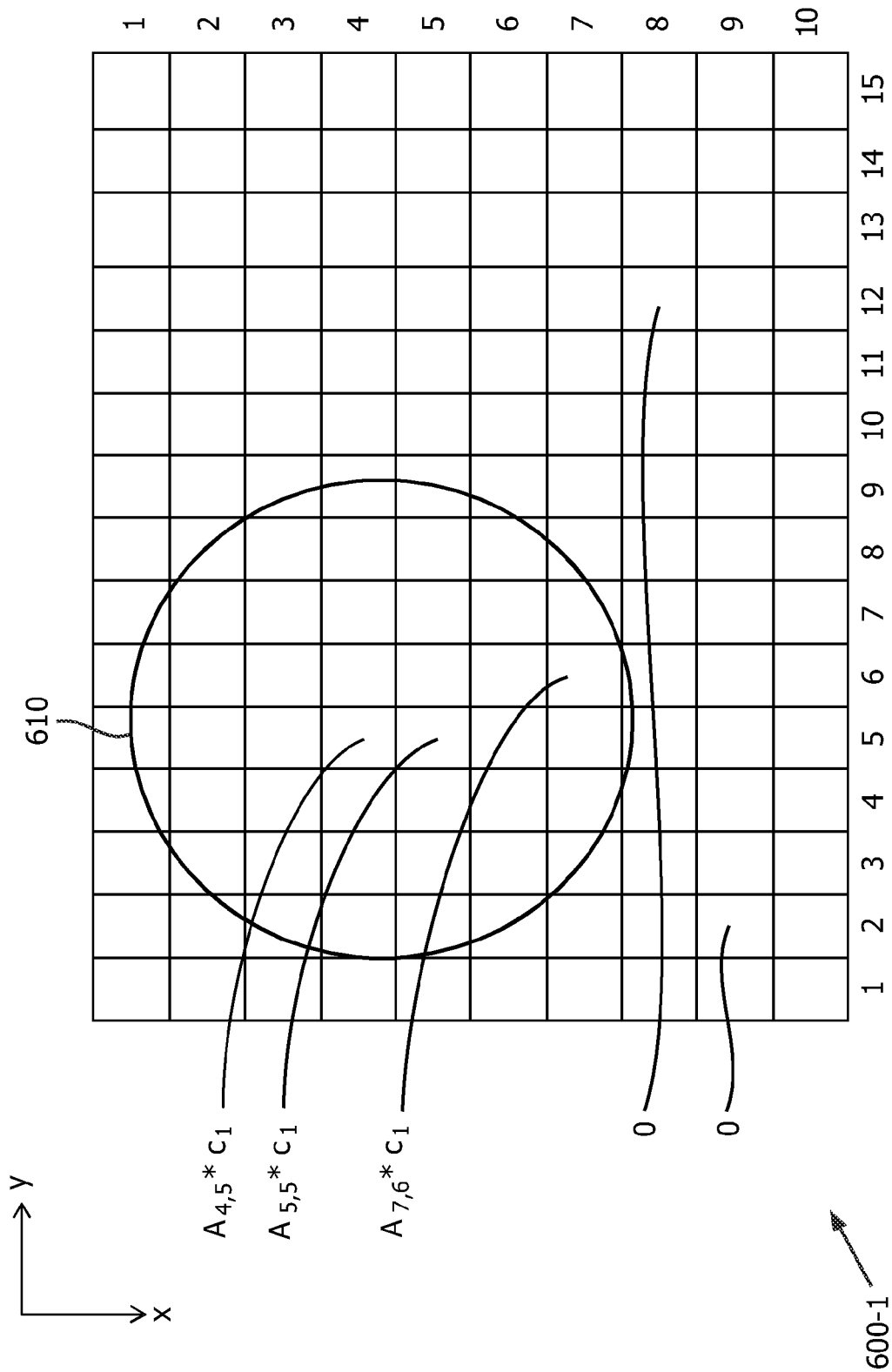
FIG. 6a is a schematic illustration of a first image of the series of images taken when only one light source provides a light contribution to a scene, according to one embodiment of the present invention.

Because the exposure time of the camera is set to be equal to a single code bit of the code, the intensity at a particular pixel of an image is affected by the value of the bit of the code encoded into the light output of the light source 220-1 at the time the image is taken. Such a first image is shown in FIG. 6a (this image corresponds to Frame 1 illustrated in FIG. 5). The footprint of the light source 220-1 within the scene is shown as a circle 610. As shown, an image 600-1 is divided into 2D grid of 150 pixels, with 10 pixels in the x-direction and 15 pixels in the y-direction. Depending on the desired resolution, the images may be divided into more pixels or less pixels. Each pixel represents an intensity of the total light output of the illumination system at a different physical position within the scene. Because the first image 600-1 is taken when the light output of the light source 220-1 is modulated with the first code bit, $c_1$ (see, in FIG. 5, how camera exposure of Frame 1 of the exposure 530 overlaps with the signal 520), the intensity at each pixel is the product of the first code bit $c_1$ and a value of what the intensity would be if the drive signal applied to the light source 220-1 was not modulated with the particular code bit, $A_{x,y}$, for a pixel having coordinates (x,y). Thus, as shown in FIG. 6a, the intensity at e.g. a pixel (4,5) is equal to $A_{4,5} \cdot c_1$, the intensity at a pixel (5,5) is equal to $A_{5,5} \cdot c_1$, and the intensity at a pixel (7,6) is equal to $A_{7,6} \cdot c_1$. Note that the intensities at e.g. pixels (8,12) and (9,2) are shown to be equal to zero because the light source 220-1 does not provide any light contribution to the parts of the scene represented by those pixels (the pixels are outside of the footprint 610).

Figure 6B:
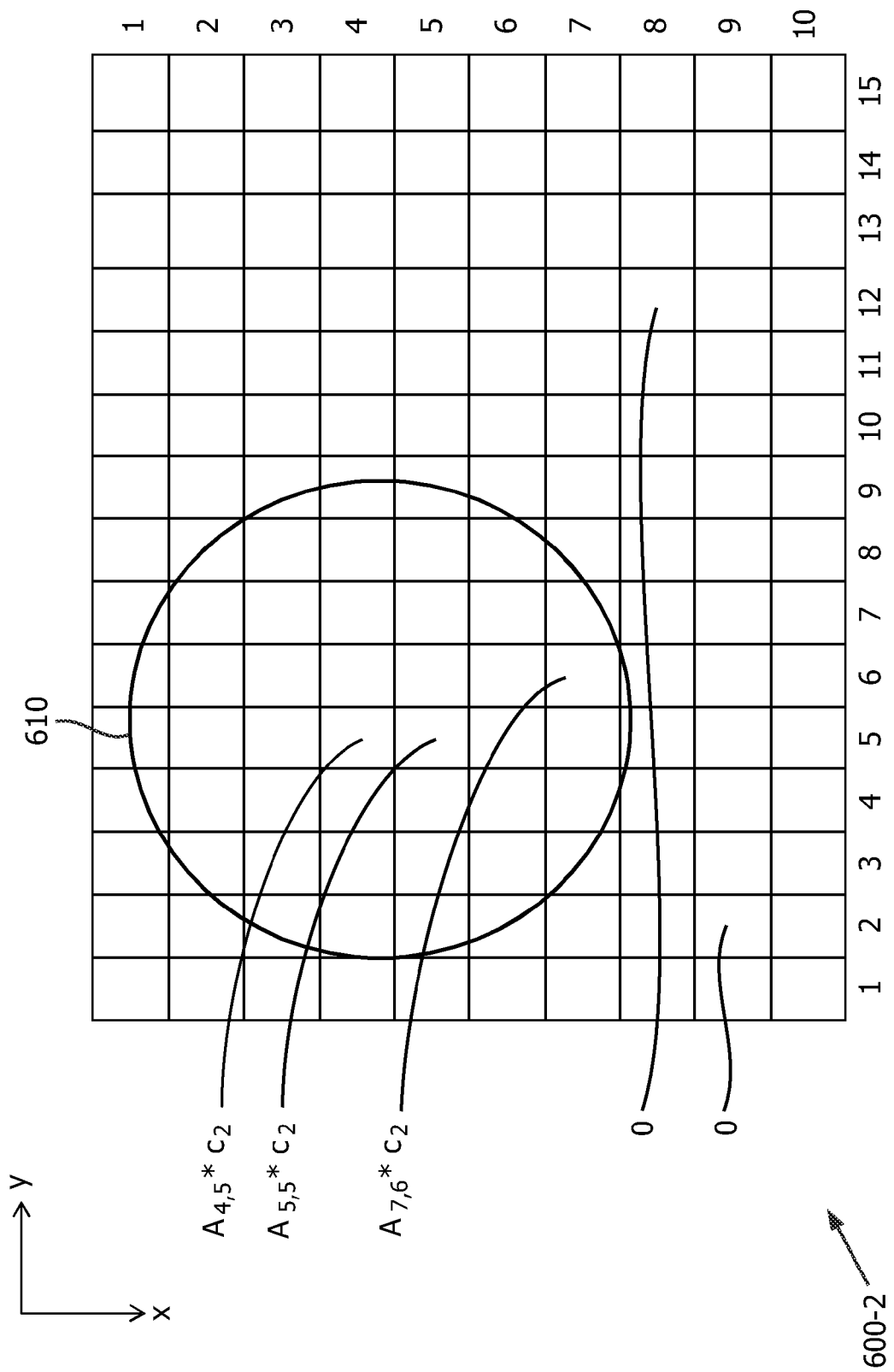
FIG. 6b is a schematic illustration of a second image of the series of images taken when only one light source provides a light contribution to a scene, according to one embodiment of the present invention.

As seen from the exposure 530, the second image of the series of images of the scene is acquired during Frame 2 of the camera 410. The second image is shown in FIG. 6b as an image 600-2. Since the image is taken of the same scene, the footprint 610 of the light source 220-1 within the scene remains the same as in the first image. Because the second image 600-2 is taken when the light output of the light source 220-1 is modulated with the second code bit, $c_2$ (see, in FIG. 5, how camera exposure of Frame 2 of the exposure 530 overlaps with the signal 520), the intensity at each pixel is the product of the second code bit $c_2$ and a value of what the intensity would be if the drive signal applied to the light source 220-1 was not modulated with the particular code bit, $A_{x,y}$ for a pixel having coordinates (x,y). Thus, as shown in FIG. 6b, the intensity at e.g. a pixel (4,5) is equal to $A_{4,5} \cdot c_2$, the intensity at a pixel (5,5) is equal to $A_{5,5} \cdot c_2$, and the intensity at a pixel (7,6) is equal to $A_{7,6} \cdot c_2$. Again, the intensities at e.g. pixels (8,12) and (9,2) are shown to be equal to zero because the light source 220-1 does not provide any light contribution to the parts of the scene represented by those pixels (the pixels are outside of the footprint 610).

Figure 6C:
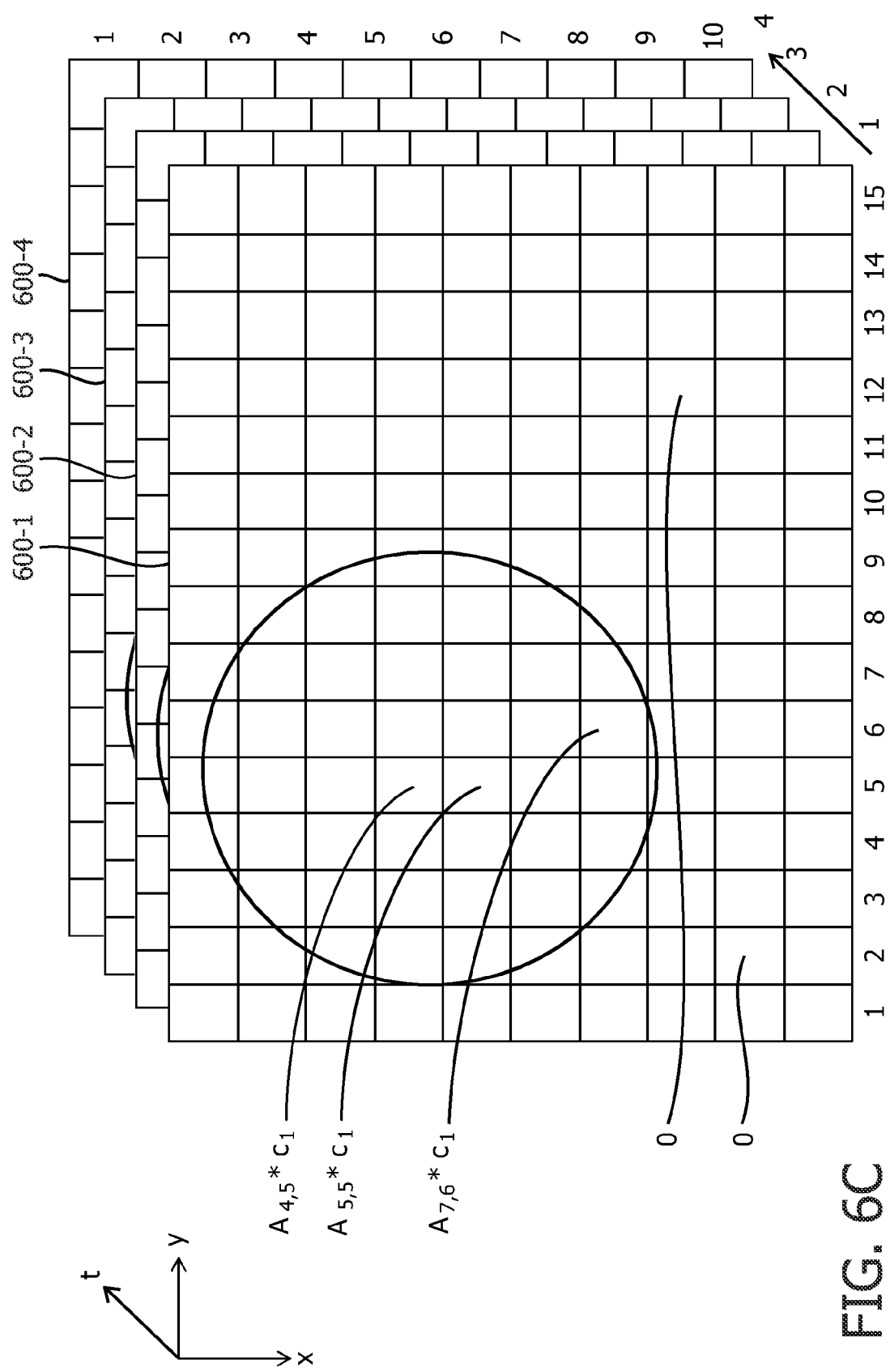
FIG. 6c is a schematic illustration of a series of images taken when only one light source provides a light contribution to a scene, according to one embodiment of the present invention.

In the similar manner, in Frames 3 and 4, the camera 410 acquires, respectively, a third image (600-3) and a fourth image (600-4) of the series of images. As can be seen from FIG. 5, because of the way the exposure time and the frame time of the camera 410 is configured with respect to the code 510, the third image is taken when the light output of the light source 220-1 is modulated with the third code bit, $c_3$, and the fourth image is taken when the light output of the light source 220-1 is modulated with the fourth code bit, $c_4$. The series of images 600-1, 600-2, 600-3, and 600-4 are shown in FIG. 6c, where the different images are shown to extend in the t-direction (where "t" stands for "time"), representing that the images are taken of the same scene, but at different times.

Having acquired the series of images 600-1 through 600-4, the processing unit 430 can process the series of images to determine whether the light contribution of the first light source 220-1 is present at the selected physical position within the scene.

Figure 7:
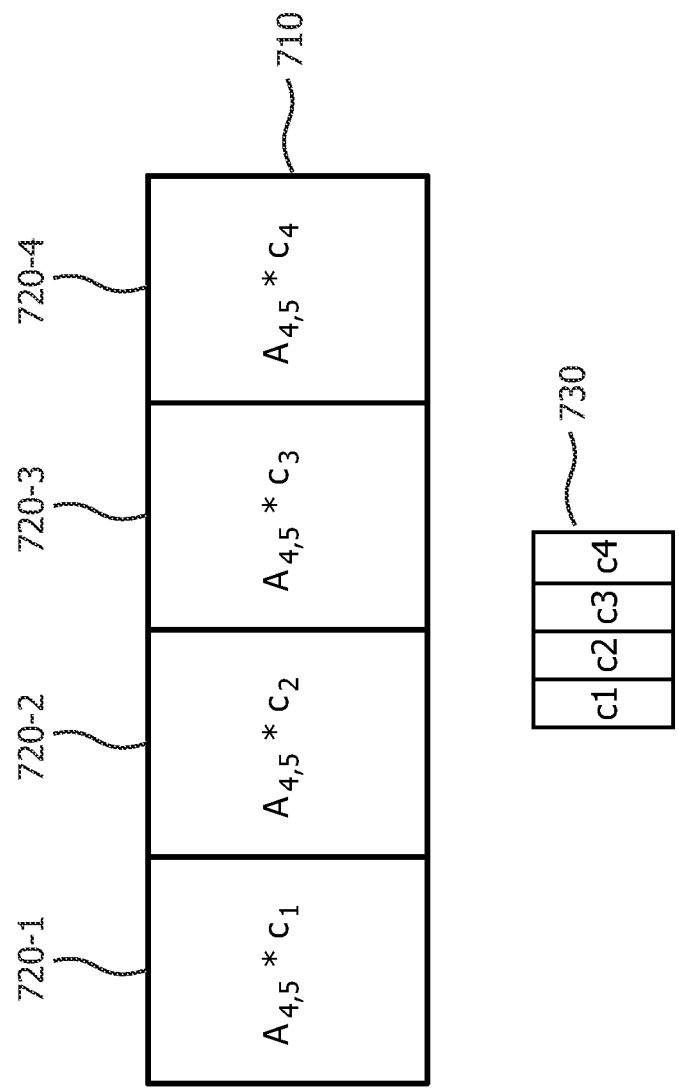
FIG. 7 is a schematic illustration of a sequence of pixels of the acquired series corresponding to a selected physical position within the scene and a first sequence of N symbols, when only one light source provides a light contribution to a scene, according to one embodiment of the present invention

To that end, in one embodiment, the processing unit 430 may be configured to correlate a sequence of pixels of the acquired series corresponding to a selected physical position within the scene with the first sequence of N symbols. To illustrate this, consider that the selected physical position within the scene is the position corresponding to pixel (4,5) on the images 600-1 through 600-4. Then the sequence of pixels of the acquired series corresponding to that position comprises pixels (4,5) from each of the images. This sequence is shown as a sequence 710 in FIG. 7. The sequence 710 includes a pixel (4,5) from the first image 600-1 (shown as a pixel 720-1), a pixel (4,5) from the second image 600-2 (shown as a pixel 720-2), a pixel (4,5) from the third image 600-3 (shown as a pixel 720-3), and a pixel (4,5) from the fourth image 600-4 (shown as a pixel 720-4). As shown in FIG. 7, the intensities at the pixels 720-1 through 720-4 are equal to $A_{4,5} \cdot c_1$, $A_{4,5} \cdot c_2$, $A_{4,5} \cdot c_3$, and $A_{4,5} \cdot c_4$, respectively. Thus, the processing unit 430 correlates the sequence 710 with the first sequence of N symbols, which, in the current scenario, is the Sequence 1 illustrated in FIG. 5 and shown again in FIG. 7 as a sequence 730.

As a result of the correlation, a first correlation output having at least one peak is generated. As previously described, a correlation output typically includes a number of "peaks," some are smaller than the others and represent artifacts of the correlation process. Such small peaks are referred to herein as "subpeaks" and the term "peak" is used herein to describe a peak in a correlation output that indicate presence of the sequence 730 within the sequence 710. This peak would be clearly higher than the subpeaks in the correlation output and a person skilled in the art could easily identify such a peak. Therefore, based on the correlation of the sequence 710 with the sequence 730, the processing unit 430 is able to determine that the light contribution of the first light source 220-1 is present at the selected physical position within the scene if the correlation output includes a peak. A similar correlation may be performed for any other selected physical position within the scene by correlating a sequence of pixels from images 600-1 through 600-4 corresponding to the selected position within the scene with the sequence 730.

Figure 6D:
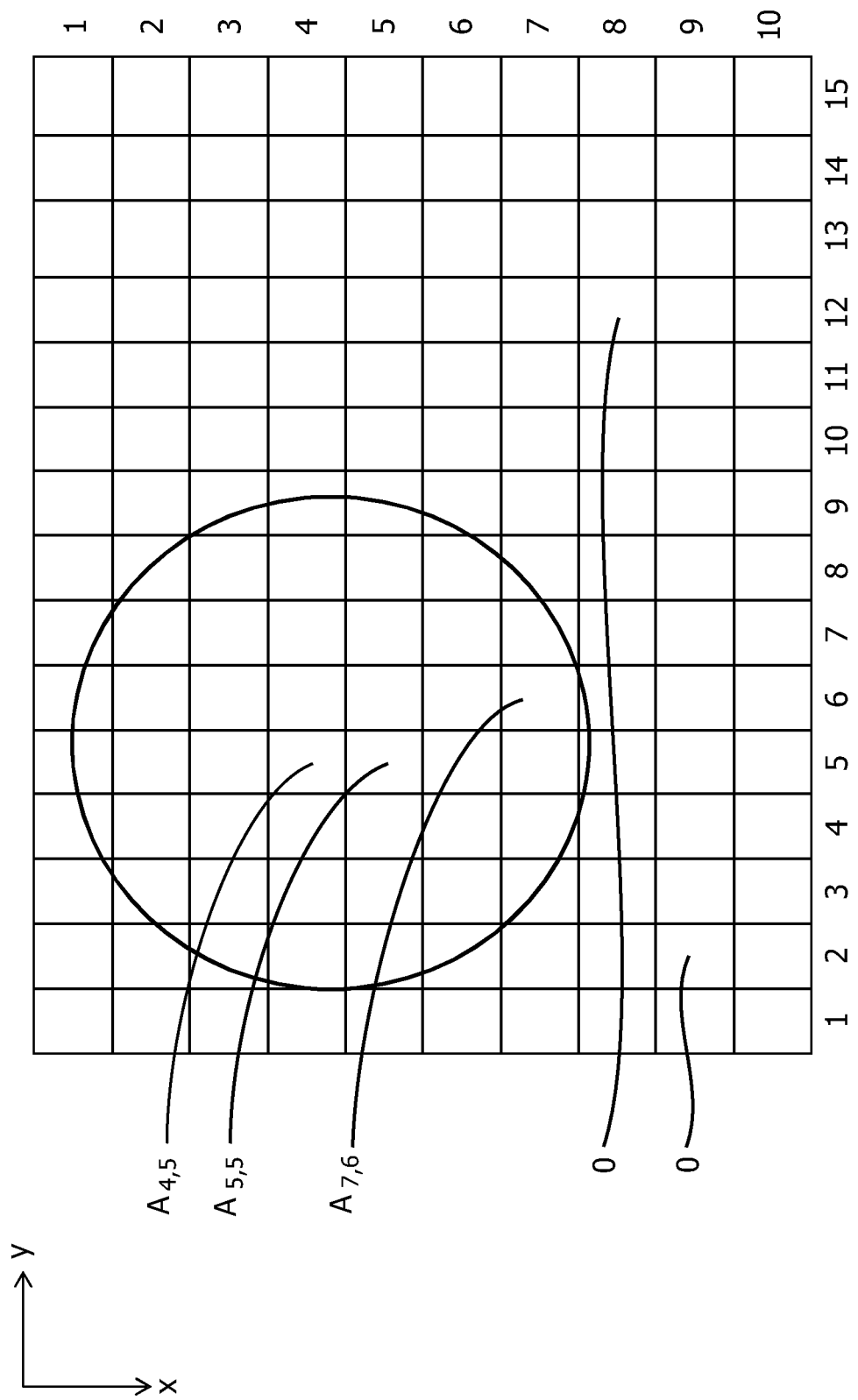
FIG. 6d is a schematic illustration of the result of a correlation of a sequence of pixels of the acquired series corresponding to a selected physical position within the scene with the first sequence of N symbols performed for all positions within the scene, when only one light source provides a light contribution to a scene, according to one embodiment of the present invention.

In addition, when the light contribution of the first light source 220-1 is present at the selected physical position within the scene, correlating the sequence 710 with the sequence 730 allows the processing unit 430 to determine the light contribution of the first light source 220-1 at that position, i.e. the value of $A_{x,y}$. By performing such correlation for each pixel of the series of images, the value of $A_{x,y}$ may be obtained for all pixels within the image, thus allowing the processing unit 430 to determine the footprint of the light source 220-1 within the scene, as shown in FIG. 6d.

If the data embedded into light output of the illumination system comprises some kind of identifiers, such as e.g. identifiers of the light sources, then the number of different light sources that may be identified in the manner described above depends on the length of the code period. For instance, for a synchronous Walsh-Hadamard code comprising a repeating sequence of N binary values, N different light sources may be identified, which means that the processing unit 430 can determine whether the light contribution of any one of the N different light sources is present at a particular position within a scene and, optionally, determine the magnitude of such a light contribution. Using a conventional 50 Hz camera (i.e. the camera can take 50 images per second) configured to have a single bit-long exposure instance at each frame, a series of images necessary for resolving a 50-bit sequence of the embedded code may be acquired in 1 second.

In one embodiment, the embedded code comprises a sequence that has good autocorrelation properties. When used in a system where every light source is assigned a unique code, one preferably wants these codes to be orthogonal. Examples of this would be the Walsh-Hadamard codes, where the length of the code equals the number of light sources to be assigned a code. These codes, however, typically requires synchronous operation, which is not always desired due to additional complexity. Therefore, another desirable property of the codes is to have good cross-correlation properties, i.e. a high autocorrelation and low cross-correlation between the codes. Examples of such codes include pseudo-random sequences, codes generated by linear feedback shift registers, or other codes that might be used for code division multiple access communication systems.

In yet another embodiment all light sources are assigned unique switching frequencies, which serve as identification code. Also these yield low cross-correlation and high autocorrelation.

Persons skilled in the art will recognize that, for all of the scenarios described herein, other methods for processing the series of images to determine whether the light contribution of a light source is present at the selected physical position within the scene may be carried out by the processing unit 430. For example, the processing unit 430 may generate various sequences of N pixels, for example corresponding to different codes, and determine which one of these sequences matches with the sequence of pixels of the acquired series of images corresponding to the selected physical position (in this scenario, the sequence 710), which can be done e.g. with a maximum likelihood search. Other methods may be envisioned as well.

In other embodiments, the frame time of the camera may be set to be equal to any integer multiple of $T_{bit}$, as long as the frame time is not an integer multiple or an integer fraction of the code period (in which case each image would contain the values of the same code bit). For example, if the code period is equal to $7*T_{bit}$, the frame time of the camera may be set to be two bits greater or two bits less than the code period, i.e. $9*T_{bit}$ or $5*T_{bit}$. Further, the camera 410 may be configured to acquire an image during the any time period $T_{bit}$ of each frame, not necessarily during the first time period $T_{bit}$ of each frame. It is, however, important that the exposure instances coincide with the entire bits of the code (i.e., that each exposure instance starts substantially when the new code bit is applied to modulate the drive signal applied to the light source and ends when the application of the new code bit ends).

Further, in other embodiments dealing with the repeating sequence of N bits, more than N images may be acquired and processed by the processing unit 430. In one embodiment, this can be used to improve the probability of detection of the light sources. For example, when 2N images are acquired, one can average over the 2 sets of N images to further suppress the influence of noise on the detection. This is specifically advantageous in low-light conditions, since in the proposed methods the exposure instants are typically small compared to exposure period.

Moreover the more than N images might be used to track changes in the light contributions of the different light sources over time. The first N images can be used to make the first estimate of the light contributions, all consecutive images can then be used to update the estimates based on the dynamics of the scheme.

Scenario 2: Multiple Light Sources, Single-Bit Exposure Per Frame

Now, consider an exemplary scenario where the illumination system 200 is such that two light sources can provide light contribution to a particular scene. Consider that the scene is a part of the floor of the structure 100, illustrated in FIG. 1, the first light source is the one of the light sources 120 illustrated in FIG. 1 having the footprint 125b within the scene (i.e., on the floor), and the second light source is the one of the light sources 120 illustrated in FIG. 1 having the footprint 125c within the scene. The two light sources within the illumination system 200 may operate either in a synchronous mode or in an asynchronous mode. In the synchronous mode, the sequences of the embedded codes used with the two light sources completely overlap in time (i.e., the sequence of the first embedded code begins at the same time as the sequence of the second embedded code). In the asynchronous mode, the sequences of the embedded codes used with the two light sources do not overlap in time (i.e., the sequence of the first embedded code begins at different times than the sequence of the second embedded code). For either synchronous or asynchronous mode of operation, the respective embedded codes include different repeating sequences of N bits.

Similar to the first scenario, consider that the repeating sequence of the code embedded into the light output of the first light source includes 4 bits, $c_{11}, c_{12}, c_{13}, c_{14}$, and that the repeating sequence of the code embedded into the light output of the second light source includes 4 bits, $c_{21}, c_{22}, c_{23}, c_{24}$. Again, each of the bits has duration $T_{bit}$ and the code period is, therefore, equal to $4*T_{bit}$.

Discussion of the first scenario regarding how the bits of the code may be embedded into the light output of the light sources are applicable here and, therefore, in the interests of brevity, are not repeated here.

Further assume that the detection system 400 may already contain or may obtain the codes embedded into the light output of the first and second light sources.

In such a scenario, the detection system 400 may be configured to operate in the following manner in order to determine whether the light output of the first and second light sources is present at any selected position within the scene.

Figure 8A:
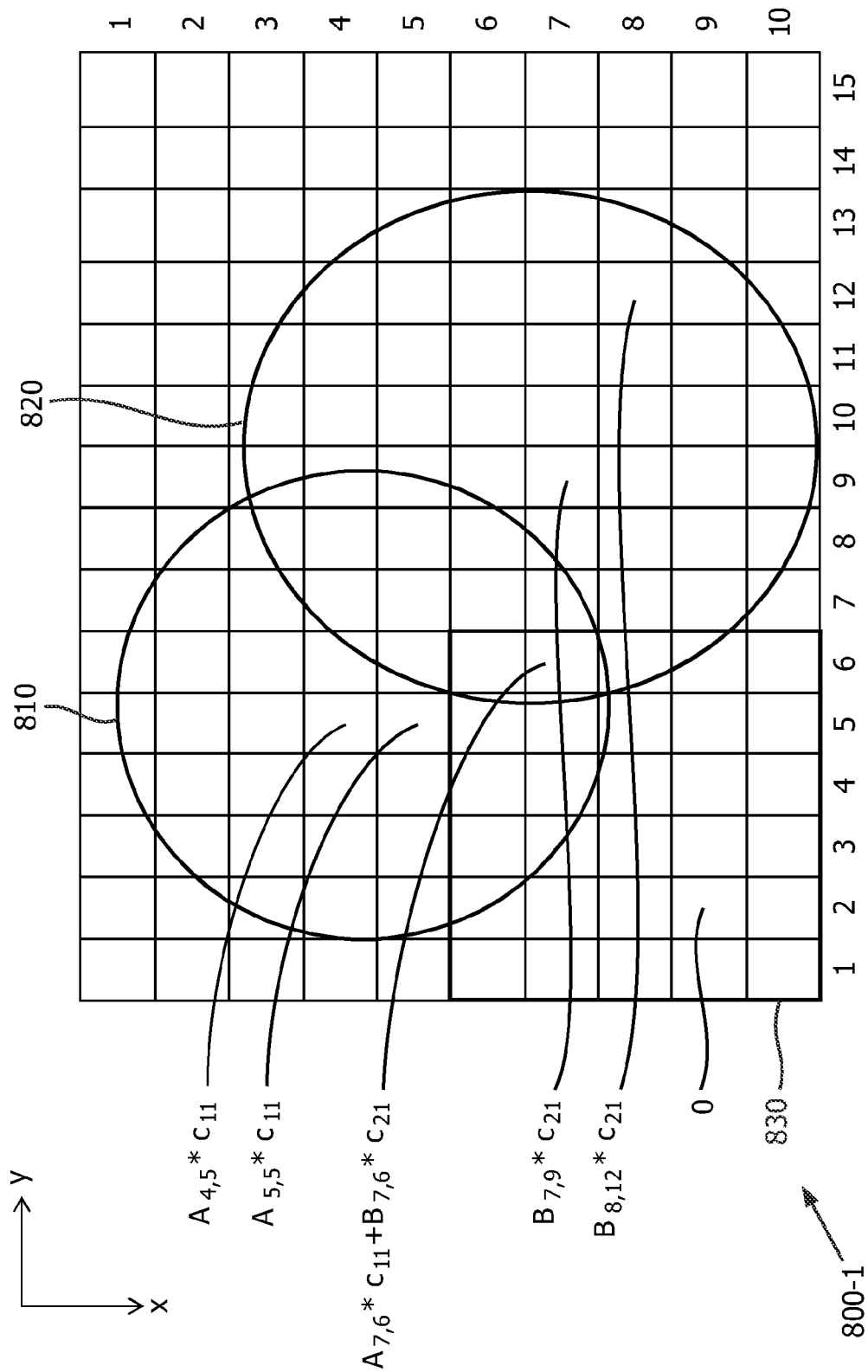
FIG. 8a is a schematic illustration of a first image of the series of images taken when two light sources provide light contributions to a scene, according to one embodiment of the present invention.

First, the camera 410 is configured to acquire a series of images of the scene in the manner described in the first scenario. Again, when an image is taken, the camera acquires intensities of the total light output of the illumination system at all of the positions within a scene. In this scenario, the total light output comprises the light output of the first light source and the light output of the second light source. Each image is again divided into 2D grid of 150 pixels, with 10 pixels in the x-direction and 15 pixels in the y-direction. Because the exposure time of the camera is set to be equal to a single code bit of the code, the intensity at a particular pixel of an image is affected by the value of the bit of the code encoded into the light output of the first light source and the value of the bit of the code encoded into the light output of the second light source at the time the image is taken. Such a first image is shown in FIG. 8a (this image corresponds to Frame 1 illustrated in FIG. 5). The footprint of the first light source within the scene is shown as a circle 810 and the footprint of the second light source is shown as a circle 820. Because the first image 800-1 is taken when the light output of the first light source is modulated with the code bit $c_{11}$ and the light output of the second light source is modulated with the code bit $c_{21}$, the intensity $I_{x,y}$ at each pixel (x,y) may be calculated as follows:

$$I_{x,y}=A_{x,y}\cdot c_{11}+B_{x,y}\cdot c_{21},$$

where $A_{x,y}$ and $B_{x,y}$ are respective values of what the intensities of the light output of the first and second light sources would be if the drive signals applied to the first and second light sources were not modulated with the particular code bit. Thus, as shown in FIG. 8a, the intensity at e.g. a pixel (7,6) is equal to $(A_{7,6}\cdot c_{11}+B_{7,6}\cdot c_{21})$. Further, as shown in FIG. 8a, the intensity at e.g. a pixel (4,5) is equal to $A_{4,5}\cdot c_{11}$ and the intensity at a pixel (5,5) is equal to $A_{5,5}\cdot c_{11}$ because the second light source does not provide any light contribution to the parts of the scene represented by these pixels (these pixels are outside of the footprint 820), i.e. $B_{4,5}=B_{5,5}=0$. Similarly, the intensity at e.g. a pixel (7,9) is equal to $B_{7,9}\cdot c_{21}$ and the intensity at a pixel (8,12) is equal to $B_{8,12}\cdot c_{21}$ because the first light source does not provide any light contribution to the parts of the scene represented by these pixels (these pixels are outside of the footprint 810), i.e. $B_{7,9}=B_{8,12}=0$. The intensity at e.g. pixel (9,2) is shown to be equal to zero because neither the first nor the second light sources provide any light contribution to the part of the scene represented by this pixel (this pixel is outside of the footprint 810 and 820).

As seen from the exposure 530, the second image of the series of images of the scene is acquired during Frame 2 of the camera 410. The second image is shown in FIG. 8b as an image 800-2. Since the image is taken of the same scene, the footprints 810 and 820 remain the same as in the first image. Because the image 800-2 is taken when the light output of the first light source is modulated with the code bit $c_{12}$ and the light output of the second light source is modulated with the code bit $c_{22}$, the intensity at each pixel (x,y) may be calculated as follows:

$$I_{x,y}=A_{x,y}\cdot c_{12}+B_{x,y}\cdot c_{22}.$$

Thus, as shown in FIG. 8b, the intensity at e.g. a pixel (7,6) is equal to $(A_{7,6}\cdot c_{12}+B_{7,6}\cdot c_{22})$. Further, as shown in FIG. 8a, the intensity at e.g. a pixel (4,5) is equal to $A_{4,5}\cdot c_{12}$, the intensity at a pixel (5,5) is equal to $A_{5,5}\cdot c_{12}$, the intensity at a pixel (7,9) is equal to $B_{7,9}\cdot c_{22}$, and the intensity at a pixel (8,12) is equal to $B_{8,12}\cdot c_{22}$. Again, the intensity at e.g. pixel (9,2) is shown to be equal to zero because neither the first nor the second light sources provide any light contribution to the part of the scene represented by this pixel.

Figure 8C:
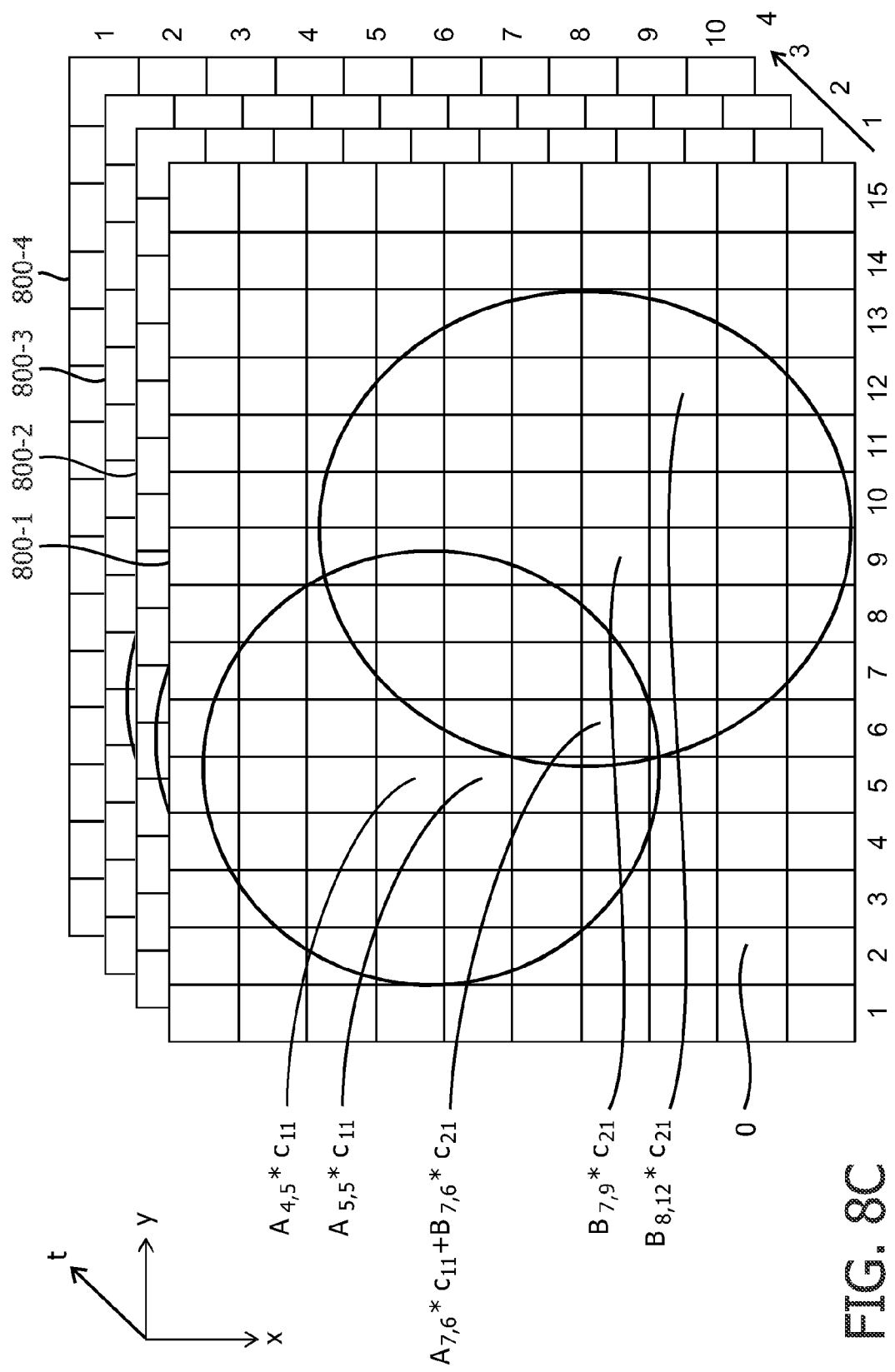
FIG. 8c is a schematic illustration of a series of images taken when two light sources provide light contributions to a scene, according to one embodiment of the present invention.

In the similar manner, in Frames 3 and 4, the camera 410 acquires, respectively, a third image (800-3) and a fourth image (800-4) of the series of images. Again, because of the way the exposure time and the frame time of the camera 410 is configured with respect to the embedded codes, the third image is taken when the light outputs of the first and second light sources are modulated with the code bits $c_{13}$ and $c_{23}$, respectively, and the fourth image is taken when the light outputs of the first and second light sources are modulated with the code bits $c_{14}$ and $c_{24}$, respectively. The series of images 800-1, 800-2, 800-3, and 800-4 are shown in FIG. 8c, where the different images are shown to extend in the t-direction, representing that the images are taken of the same scene, but at different times.

Having acquired the series of images 800-1 through 800-4, the processing unit 430 may be configured to correlate a sequence of pixels of the acquired series corresponding to a selected physical position within the scene with the first and second sequences of N symbols (i.e., the repeating sequence of the code embedded into the light output of the first light source and the repeating sequence of the code embedded into the light output of the second light source). As described in the first scenario, presence of a peak in the correlation output means that the light contribution of the first and/or the second light source is present at the selected position within the scene.

Thus, in order to determine whether a light contribution of the first light source is present at a pixel (x,y), the processing unit 430 correlates the sequence $(A_{x,y} \cdot c_{11} + B_{x,y} \cdot c_{21})$, $(A_{x,y} \cdot c_{12} + B_{x,y} \cdot c_{22})$, $(A_{x,y} \cdot c_{13} + B_{x,y} \cdot c_{23})$, $(A_{x,y} \cdot c_{14} + B_{x,y} \cdot c_{24})$ with the sequence $c_{11}$, $c_{12}$, $c_{13}$, $c_{14}$. Similarly, in order to determine whether a light contribution of the second light source is present at a pixel (x,y), the processing unit 430 correlates the same first sequence as for the first light source (i.e., the sequence $(A_{x,y} \cdot c_{11} + B_{x,y} \cdot c_{21})$, $(A_{x,y} \cdot c_{12} + B_{x,y} \cdot c_{22})$, $(A_{x,y} \cdot c_{13} + B_{x,y} \cdot c_{23})$, $(A_{x,y} \cdot c_{14} + B_{x,y} \cdot c_{24})$) with the sequence $c_{21}$, $c_{22}$, $c_{23}$, $c_{24}$.

Figure 8D:
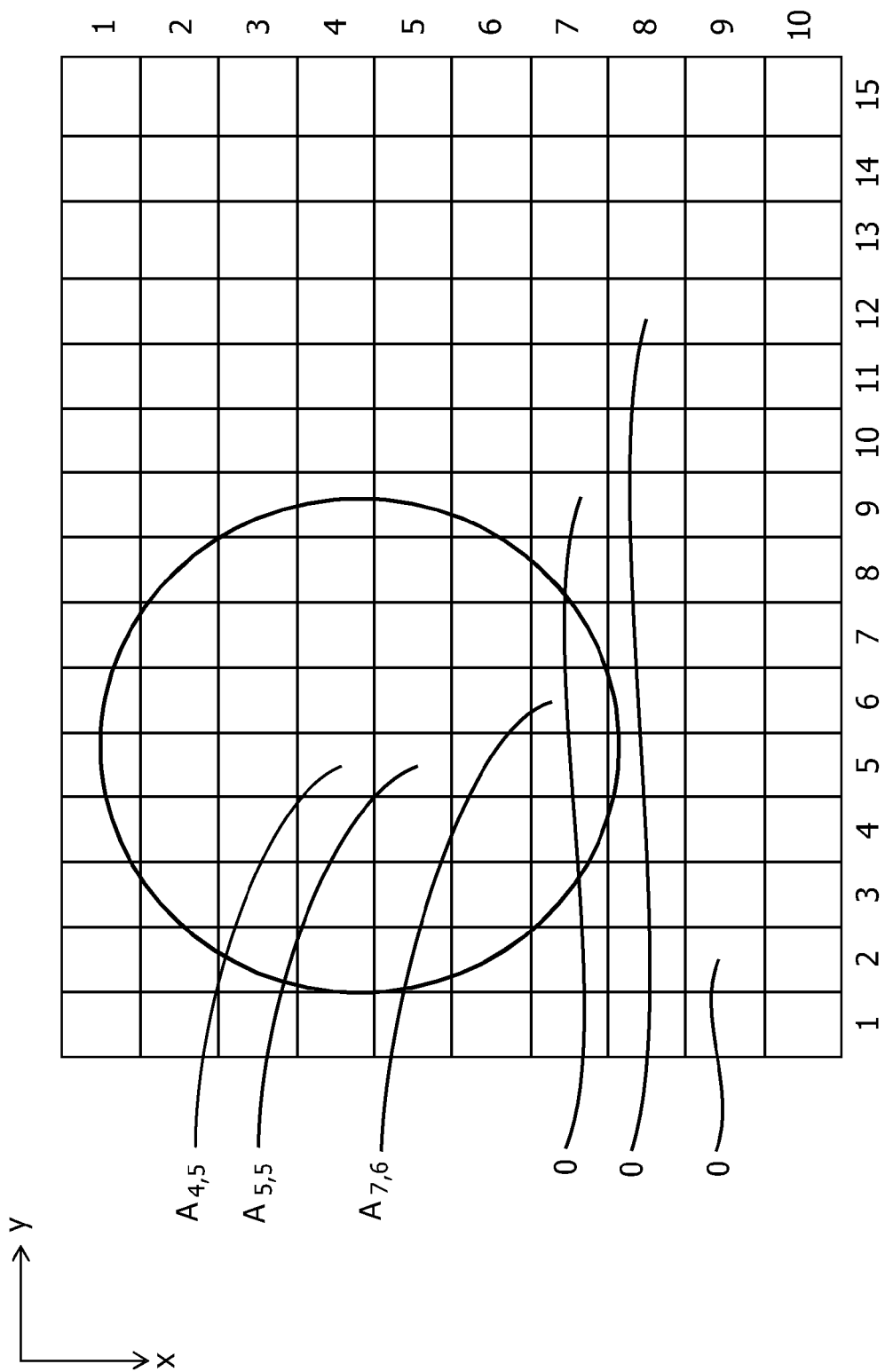
FIG. 8d is a schematic illustration of the result of a correlation of a sequence of pixels of the acquired series corresponding to a selected physical position within the scene with the first sequence of N symbols performed for all positions within the scene, when two light sources provide light contributions to a scene, according to one embodiment of the present invention.

In addition, similar to the first scenario, when the light contribution of the first light source is present at a position within the scene corresponding to pixel (x,y), correlating the sequence $(A_{x,y} \cdot c_{11} + B_{x,y} \cdot c_{21})$, $(A_{x,y} \cdot c_{12} + B_{x,y} \cdot c_{22})$, $(A_{x,y} \cdot c_{13} + B_{x,y} \cdot c_{23})$, $(A_{x,y} \cdot c_{14} + B_{x,y} \cdot c_{24})$ with the sequence $c_{11}$, $c_{12}$, $c_{13}$, $c_{14}$ allows the processing unit 430 to determine the light contribution of the first light source at that position, i.e. the value of $A_{x,y}$. By performing such correlation for each pixel of the series of images, the value of $A_{x,y}$ may be obtained for all pixels within the image, thus allowing the processing unit 430 to determine the footprint of the first light source within the scene, as shown in FIG. 8d.

Figure 8E:
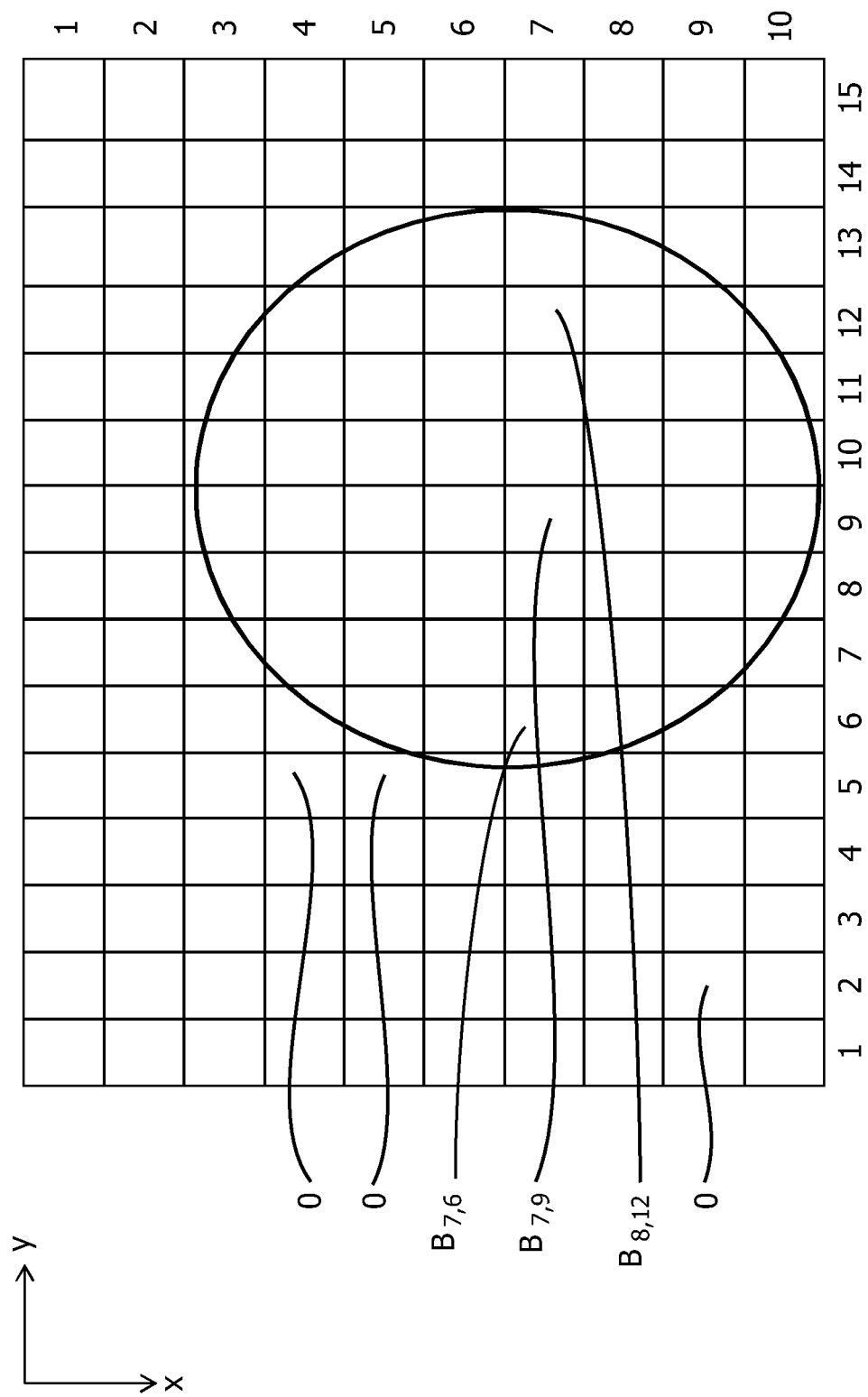
FIG. 8e is a schematic illustration of the result of a correlation of a sequence of pixels of the acquired series corresponding to a selected physical position within the scene with the second sequence of N symbols performed for all positions within the scene, when two light sources provide light contributions to a scene, according to one embodiment of the present invention.

Similarly, when the light contribution of the second light source is present at a position within the scene corresponding to pixel (x,y), correlating the sequence $(A_{x,y} \cdot c_{11} + B_{x,y} \cdot c_{21})$, $(A_{x,y} \cdot c_{12} + B_{x,y} \cdot c_{22})$, $(A_{x,y} \cdot c_{13} + B_{x,y} \cdot c_{23})$, $(A_{x,y} \cdot c_{14} + B_{x,y} \cdot c_{24})$ with the sequence $c_{21}$, $c_{22}$, $c_{23}$, $c_{24}$ allows the processing unit 430 to determine the light contribution of the second light source at that position, i.e. the value of $B_{x,y}$. By performing such correlation for each pixel of the series of images, the value of $B_{x,y}$ may be obtained for all pixels within the image, thus allowing the processing unit 430 to determine the footprint of the second light source within the scene, as shown in FIG. 8e.

While the current scenario deals with two light sources, a similar approach may be implemented not only for two light sources, but also for any other number of light sources greater than two. The steps performed by the processing unit 430 described above may be preferable for a relatively small number of light sources and/or a relatively small number of pixels within the image. However, when there are a large number of light sources present in the illumination system, performing a correlation for each of the embedded codes of the various light sources for each of the pixels may become too computationally intensive for the processing unit 430. Therefore, an embodiment described below allows determining whether a light contribution of a particular light source is present within a particular part of the scene (as opposed to a particular position within the scene, described above). This embodiment allows determining e.g. whether the first light source provides a light contribution to an upper left quadrant of the scene and, only if this is the case, determining whether the light contribution is present at particular selected positions within the left quadrant of the scene.

According to this alternative embodiment, having acquired the series of images 800-1 through 800-4 in the manner described above, the processing unit 430 may be configured, for each acquired image, to determine a sum of the pixels included in a part of the image corresponding to a particular part of the scene. For the purpose of illustration, consider that the particular part of interest of the scene corresponds to the area shown in FIG. 8a as a rectangle 830, comprising pixels with x coordinates between 6 and 10 and y coordinates between 1 and 6. Then, for the first image, the processing unit 430 determines the sum $S_1$ as follows:

$$S_1 = \sum_{x=6}^{10} \sum_{y=1}^{6} I_{x,y,1},$$

where $I_{x,y} = A_{x,y} \cdot c_{11} + B_{x,y} \cdot c_{21}$.

Similarly, for the second image, the processing unit 430 determines the sum $S_2$ as follows:

$$S_2 = \sum_{x=6}^{10} \sum_{y=1}^{6} I_{x,y,2},$$

where $I_{x,y,2} = A_{x,y} \cdot c_{12} + B_{x,y} \cdot c_{22}$

For the third image, the processing unit 430 determines the sum $S_3$ as follows:

$$S_3 = \sum_{x=6}^{10} \sum_{y=1}^{6} I_{x,y,3},$$

where $I_{x,y,3} = A_{x,y} \cdot c_{13} + B_{x,y} \cdot c_{23}$.

Finally, for the fourth image, the processing unit 430 determines the sum $S_4$ as follows:

$$S_4 = \sum_{x=6}^{10} \sum_{y=1}^{6} I_{x,y,4},$$

where $I_{x,y,4} = A_{x,y} \cdot c_{14} + B_{x,y} \cdot c_{24}$.

Note that, in one embodiment, the sums $S_1$, $S_2$, $S_3$, and $S_4$ may be normalized by the number of samples in the sum, which may be advantageous for being able to set an appropriate threshold level.

Next, the processing unit 430 correlates a sequence of the sums of the acquired series of images with the first sequence of N symbols. Thus, the processing unit 430 correlates the sequence $S_1$, $S_2$, $S_3$, $S_4$ with the sequence $c_{11}$, $c_{12}$, $c_{13}$, $c_{14}$ to determine whether the light contribution of the first light source is present within the area 830. Similarly, the processing unit 430 may correlate the sequence $S_1$, $S_2$, $S_3$, $S_4$ with the sequence $c_{21}$, $c_{22}$, $c_{23}$, $c_{24}$ to determine whether the light contribution of the second light source is present within the area 830. When a correlation output contains a peak above a certain threshold, the processing unit 430 can determine that the light contribution of the particular light source is present within the area 830.

Determining, in this case, what constitutes a relevant correlation peak requires some consideration. The greater the light contribution of a particular light source to the part of the scene, the greater is the magnitude of the correlation peak. Thus, for the area 830, the correlation peak for the first light source would, most likely, be greater than the correlation peak for the second light source. An appropriate threshold can be set based on the level of the noise during the acquisition of the images and the code cross-correlation properties. In one embodiment, the threshold is preferably set such that a peak due to the noise or another code is unlikely to create a peak higher than the threshold.

Once the processing unit 430 determined that a light contribution of a particular light source is present within the area 830, it may continue with determining whether a light contribution of that light source is present at a selected physical position within the area 830 in the manner described above. When the presence of a light contribution of a particular light source needs to be determined for all of the positions within a scene or a footprint of a particular light source needs to be determined for the scene, a further potentially more computationally efficient method may be, having acquired the series of images 800-1 through 800-4 in the manner described above, to configure the processing unit 430, in step 1, for each acquired image, to determine a sum of all pixels in the image. In step 2, the processing unit 430 may divide the image into two parts (e.g. divide the image into halves), and determine the sum of all pixels in each image in one of the parts (e.g. in the left half). The sum of all pixels in each image in the other part (e.g., in the right half) may then be simply determined by subtracting the sum over the first part (the left half) from the total sum. In step 3, the processing unit 430 may correlate the sequence of the sums for the first part and/or the second part of the image with the sequence of N bits encoded into the light output of a particular light source to determine whether the light contribution of the first light source is present within the respective part.

Step 2 may also be extended over ever reducing parts (e.g. ever reducing halves) of the images to finally arrive at the individual pixel level (multi-scale approach/resolution pyramid). As sums over square regions are continuously needed in this procedure, in one advantageous embodiment, the processing unit 430 is configured to first convert every incoming image into an integral image, and next do the above processing on the converted images.

All of the discussions of the first scenario regarding the type of data embedded into the light output of the illumination system, the type of sequences appropriate for the scenarios described here, and particular ways to configure the camera 410 are applicable here. Therefore, in the interests of brevity, these discussions are not repeated here.

Scenario 3: One Light Source, Multiple-Bit Exposure(s) Per Frame

Figure 9:
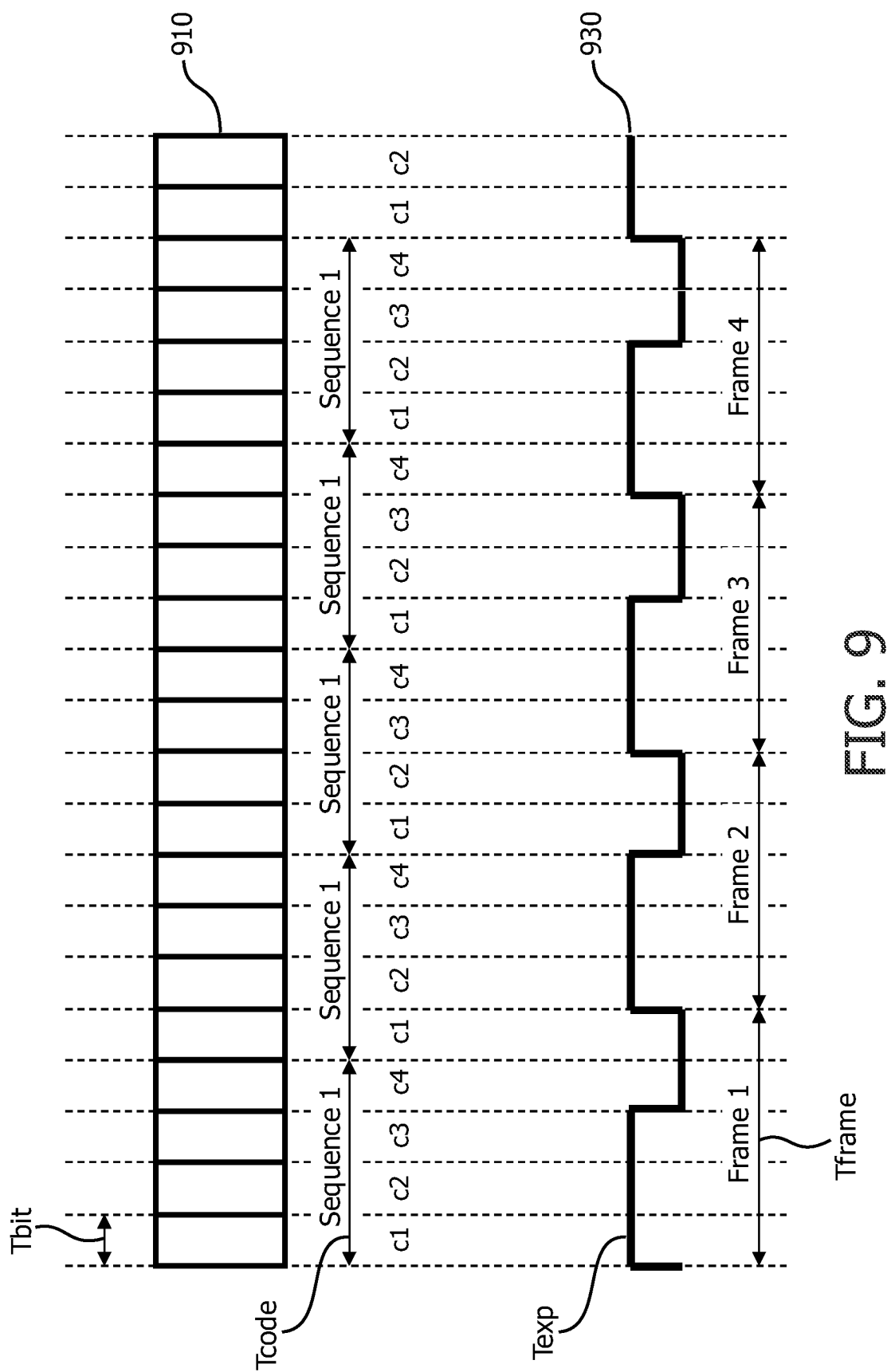
FIG. 9 provides schematic illustrations of an exemplary code comprising a repeating sequence of 4 symbols and exemplary multiple-bit exposure instances within the frames of the camera appropriate for such code, according to one embodiment of the present invention.

Next, similar to the first scenario, consider that the illumination system 200 is such that only one light source, e.g. the light source 220-1, can provide light contribution to a particular scene. Consider that the scene is a part of the floor of the structure 100, illustrated in FIG. 1, and the light source 220-1 is the one of the light sources 120 illustrated in FIG. 1 having the footprint 125a within the scene (i.e., on the floor). For simplicity, consider that the repeating sequence of the code embedded into the light output of the light source 220-1 includes only 4 bits. Such a code is shown in FIG. 9 as a code 910 and may be included in the signal 245, described in FIG. 2. As shown, each of the bits has duration $T_{bit}$. Therefore, the code period is equal to $4*T_{bit}$.

Discussion of the first scenario regarding how the bits of the code may be embedded into the light output of the light source are applicable here and, therefore, in the interests of brevity, are not repeated here.

Again, assume that the detection system 400 may already contain or may obtain the code embedded into the light output of the light source 220-1.

In such a scenario, in order to determine whether the light output of the light source 220-1 is present at any selected position within the scene, the detection system 400 may be configured to operate in a manner different from that described in the first scenario.

Again, the camera 410 is configured to acquire a series of images of the scene. To that end, the exposure of the camera may be set to comprise multiple exposure instances, each exposure instance having duration equal to the duration of one bit of the code period, i.e. $T_{bit}$. In this case, the total exposure time of the camera 410, $T_{exp}$, is the sum of durations of all of the multiple exposure instances.

First, consider that the multiple exposure instances are consecutive and that the camera 410 is configured to acquire an image during the first time period $T_{exp}$ of each frame. The exposure of the camera 410 configured in this manner with three exposure instances in each frame is illustrated in FIG. 9 with a line 930.

When an image is taken, the camera acquires intensities of the total light output of the illumination system at all of the positions within a scene. In the current scenario, the total light output of the illumination system may comprise only the light contribution from the light source 220-1.

Because the exposure time of the camera is set to be equal to a three consecutive code bits of the code, the intensity at a particular pixel of an image is affected by the values of all of the bits of the code encoded into the light output of the light source 220-1 at the time the image is taken. Each pixel represents an intensity of the total light output of the illumination system at a different physical position within the scene. Because the first image is taken when the light output of the light source 220-1 is modulated with code bits $c_1$, $c_2$, and $c_3$ (see, in FIG. 9, how camera exposure of Frame 1 of the exposure 930 overlaps with the code 910), the intensity $d_{x,y(1)}$ at each pixel (x,y) may be determined as follows:

$$d_{x,y(1)} = A_{x,y} \cdot c_1 + A_{x,y} \cdot c_2 + A_{x,y} \cdot c_3, \quad (1)$$

where $A_{x,y}$ is a value of what the intensity would be if the drive signal applied to the light source 220-1 was not modulated with the code bits $c_1$, $c_2$, and $c_3$, and subscript (1) in $d_{x,y(1)}$ indicates that this is the intensity obtained at Frame 1.

As seen from the exposure 930, the second image of the series of images of the scene is acquired during Frame 2 of the camera 410. Because the second image is taken when the light output of the light source 220-1 is modulated with the code bits $c_2$, $c_3$, and $c_4$ (see, in FIG. 5, how camera exposure of Frame 2 of the exposure 530 overlaps with the code 910), the intensity $d_{x,y(2)}$ at each pixel (x,y) may be determined as follows:

$$d_{x,y(2)} = A_{x,y} \cdot c_2 + A_{x,y} \cdot c_3 + A_{x,y} \cdot c_4. \quad (2)$$

Similarly, for the third image, the intensity $d_{x,y(3)}$ at each pixel (x,y) may be determined as:

$$d_{x,y(3)} = A_{x,y} \cdot c_3 + A_{x,y} \cdot c_4 + A_{x,y} \cdot c_1. \quad (3)$$

Finally, for the fourth image, the intensity $d_4$ at each pixel (x,y) may be determined as:

$$d_{x,y(4)} = A_{x,y} \cdot c_4 + A_{x,y} \cdot c_1 + A_{x,y} \cdot c_2. \quad (4)$$

The above intensities (1)-(4) for a particular pixel (x,y) for the four acquired images may be written as a matrix intensity $\underline{d_{x,y}}$:

$$\underline{d_{x,y}} = \begin{bmatrix} d_1 \\ d_2 \\ d_3 \\ d_4 \end{bmatrix} = A_{x,y} \begin{bmatrix} 1 & 1 & 1 & 0 \\ 0 & 1 & 1 & 1 \\ 1 & 0 & 1 & 1 \\ 1 & 1 & 0 & 1 \end{bmatrix} \times \begin{bmatrix} c_1 \\ c_2 \\ c_3 \\ c_4 \end{bmatrix}, \quad (5)$$

Using notation that $$\underline{H} = \begin{bmatrix} 1 & 1 & 1 & 0 \\ 0 & 1 & 1 & 1 \\ 1 & 0 & 1 & 1 \\ 1 & 1 & 0 & 1 \end{bmatrix}, \text{ and } \underline{c} = \begin{bmatrix} c_1 \\ c_2 \\ c_3 \\ c_4 \end{bmatrix},$$

formula (5) may be re-written as $$\underline{d_{x,y}} = A_{x,y} \underline{H} \cdot \underline{c} \quad (6)$$

In formula (6), the processing unit 430 possesses the intensity $\underline{d_{x,y}}$ from the acquired series of images, the embedded code $\underline{c}$—obtained in one of the manners described in association with FIG. 2, and H—from the way the camera 410 is configured to take the images. Thus, equation (6) is an equation with one unknown, $A_{x,y}$. Written, again, in the matrix notation, the processing unit 430 may determine the unknown $A_{x,y}$ as:

$$A_{x,y} = \underline{c}^T \cdot \underline{H}^{-1} \cdot \underline{d} \quad (7)$$

where, according to the common matrix notation, $\underline{c}^T$ denotes a transpose of the matrix $\underline{c}$ and $\underline{H}^{-1}$ denotes an inverse of the matrix $\underline{H}$, or pseudo-inverse for non-square matrix $\underline{H}$. Performing the calculation according to formula (7) is equivalent to the processing unit 430 correlating a sequence of pixels (x,y) of the acquired series of images corresponding to the selected physical position with the first sequence of N symbols. Similarly to as was described in the first scenario, as a result of the correlation, a correlation output is obtained, where the presence of a peak means that the light contribution of the light source is present at the selected physical position within the scene and the magnitude of the peak is representative of the light contribution $A_{x,y}$ provided by the light source 220-1 to the selected position within the scene. Again, similar correlation may be performed for any other selected physical position within the scene and the footprint of the light source 220-1 within the scene may be determined as previously described.

While the discussions of this scenario so far dealt with the case of the multiple exposure instances within a frame time of the camera 410 being consecutive, analogous approach would apply to multiple exposure instances that are non-consecutive. Equations (6) and (7) would still hold, whereas the difference in selecting different exposure instances for acquiring the images would be reflected in a different matrix H. Since performing a calculation according to equation (7) requires determining an inverse of the matrix H, multiple exposure instances for the series of images should be selected in such a manner so that the matrix H is invertible.

One further difference between acquiring images with multiple consecutive and multiple non-consecutive bits within the frame time of the camera 410 is in how such exposures can be implemented. Since the shutter 420 that is internal to all cameras may only open and close a single time within the frame, such a shutter may typically only be used to acquire images with multiple consecutive bits within the frame time of the camera 410.

Figure 10:
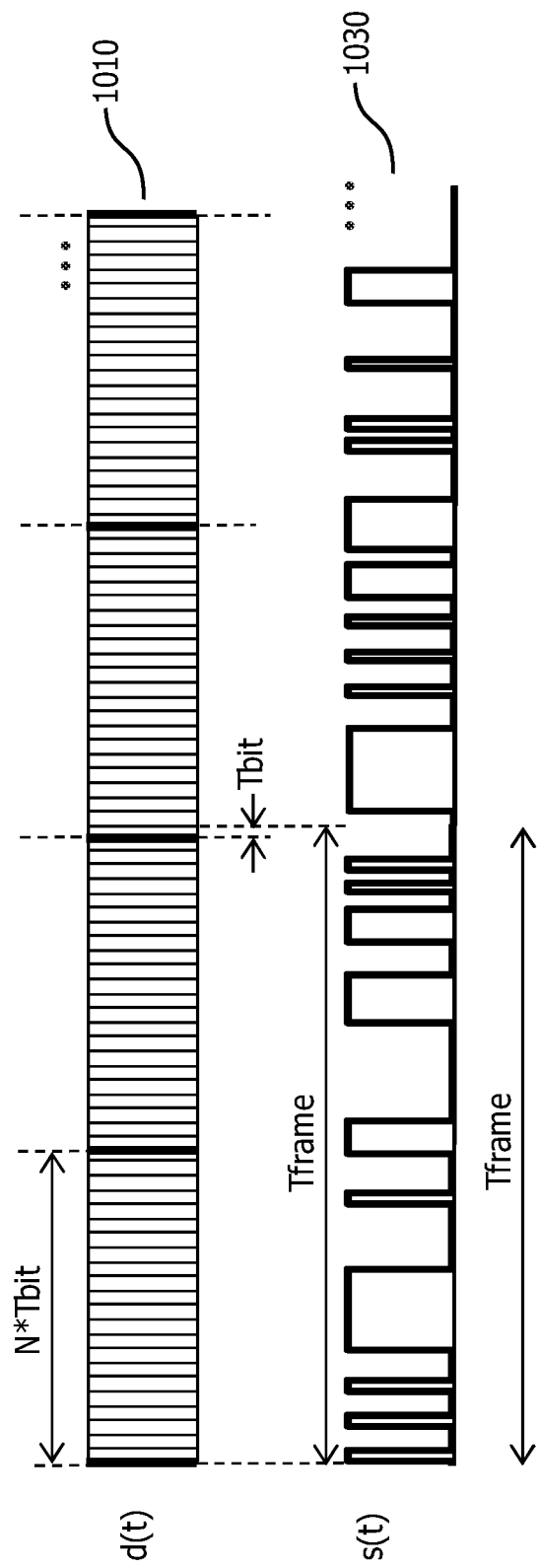
FIG. 10 provides schematic illustrations of an exemplary code comprising a repeating sequence of N symbols and exemplary switching signal used to operate a shutter external to the camera, according to one embodiment of the present invention.

On the contrary, the shutter 420 that is external to the camera 410 may be used to acquire images with both multiple consecutive and multiple non-consecutive bits within each frame. Such a shutter may be implemented as an electronic shutter disposed in front of the camera, which enables multiple open/closures of the shutter during a single frame. In one embodiment, such a shutter may be switched by a digital code. One example of the open/closure patterns enabled by the use of the shutter external to the camera 410 is illustrated as a switching signal 1030 in FIG. 10. FIG. 10 also illustrates an exemplary code 1010.

In one embodiment, the detection system 400 would then operate as follows. The combined light signal falls on the shutter 420, which is placed in front of the camera 410. The shutter 420 is operated by the switching signal 1030, which determines the open/close state of the shutter. Consider that the switching frequency of the shutter 420 is the same as that of the coded light, i.e. both use the same $T_{bit}$. The camera 410 will then integrate the incoming light over the frame time $T_{frame}$ (which also holds for all of the other embodiments described herein). By switching the shutter 420, the bits of the code 1010 during the open shutter times will be received and the others not. The resulting output signal from the shutter 420 to the camera 410 will thus be the sum over the bits during which the shutter was open.

For every frame, a different shutter code of length $T_{frame}$, where $T_{frame} = T_{bit} * N_{shut}$, is applied. In an embodiment where the shutter 420 is implemented as a shutter external to the camera 410, $N_{shut}$ is preferably an integer multiple or an integer fraction of $N_{code}$. In an embodiment where the shutter 420 is implemented as a shutter internal to the camera 410, $N_{shut}$ is preferably not equal to an integer multiple or an integer fraction of $N_{code}$. By selecting a correct set of consecutive codes to include in the switching signal 1030, i.e. such that the code matrix, H, is invertible, the signal d(t) can be recovered after electrical processing of the signals output of the camera 410. The processing unit 430 may then proceed determining whether a light contribution of the light source is present at a selected position within the scene in the manner described above.

In one embodiment, the switching signal 1030 preferably contains as much 1's as possible, since the longer the shutter 420 is open, the more light is received by the sensor of the camera 410. Suitable codes for this purpose are S-matrices, which consists of the Hadamard matrices, after removing of the first row and column.

When one wants to specifically detect only the light with a certain embedded code, the shutter 420 can be used to directly decode the signal. The shutter acts as the multiplication with the code, as part of the correlation, and the results are integrated over the length of the frame. The problem is that one would like to multiply with a code of −1 and 1 in the correlation, and the shutter can only open and close, creating a multiplication with 0 and 1. This problem can be overcome by acquiring two images, one with the shutter(t) (1=open/0=close)=code(t), and another image with the shutter(t)=1-code(t). By simply subtracting the resulting first image from the second, the same result may be obtained as by multiplying with the code consisting of −1 and 1. Consequently the processing unit 430 may determine the footprint of the lamp.

All of the discussions of the previous scenarios are applicable here and, therefore, are not repeated, except for the one regarding the duration of the frame time relative to that of the code period. In the scenario where each image is acquired with multiple exposure instances and the shutter 420 is implemented as a shutter external to the camera 410, the frame time of the camera is preferably set to be an integer multiple or an integer fraction of the code period. For example, if the code period is equal to $7*T_{bit}$, the frame time of the camera may be set to be twice the code period, i.e. $14*T_{bit}$. In the scenario where each image is acquired with multiple exposure instances and the shutter 420 is implemented as a shutter internal to the camera 410, the frame time of the camera is preferably set to be not equal to an integer multiple or an integer fraction of the code period, as illustrated in the first scenario.

One advantage of this scenario is that acquiring each image with multiple-bit exposures per frame is more light efficient, especially in low light conditions. Therefore, the impact of noise on the detection process may be reduced.

Scenario 4: Two Light Sources, Multiple-Bit Exposure(s) Per Frame

Next, similar to the second scenario, consider that the illumination system 200 is such that two light sources can provide light contribution to a particular scene, where the scene is a part of the floor of the structure 100, illustrated in FIG. 1, the first light source is the one of the light sources 120 illustrated in FIG. 1 having the footprint 125b within the scene (i.e., on the floor), and the second light source is the one of the light sources 120 illustrated in FIG. 1 having the footprint 125c within the scene. Again, the two light sources within the illumination system 200 may operate either in a synchronous mode or in an asynchronous mode. For either synchronous or asynchronous mode of operation, the respective embedded codes include different repeating sequences of N bits.

Similar to the second scenario, consider that the repeating sequence of the code embedded into the light output of the first light source includes 4 bits, $c_{11}, c_{12}, c_{13}, c_{14}$, and that the repeating sequence of the code embedded into the light output of the second light source includes 4 bits, $c_{21}, c_{22}, c_{23}, c_{24}$. Again, each of the bits has duration $T_{bit}$ and the code period is, therefore, equal to $4*T_{bit}$. Further assume that the detection system 400 may already contain or may obtain the codes embedded into the light output of the first and second light sources.

Discussion of the previous scenarios regarding how the bits of the code may be embedded into the light output of the light sources are applicable here and, therefore, in the interests of brevity, are not repeated here.

The detection system 400 may be configured to operate in the following manner in order to determine whether the light output of the first and second light sources is present at any selected position within the scene.

First, the camera 410 is configured to acquire a series of images of the scene in the manner described in the previous scenario, except that the total light output comprises the light output of the first light source and the light output of the second light source. Each image is again divided into 2D grid of 150 pixels, with 10 pixels in the x-direction and 15 pixels in the y-direction. Because the exposure time of the camera is set to be equal to three code bits of the code, the intensity at a particular pixel of an image is affected by the values of all of the bits of the code encoded into the light output of the light source 220-1 at the time the image is taken. Each pixel represents an intensity of the total light output of the illumination system at a different physical position within the scene. Since, similar to the previous scenario, the first image is taken when the light output of the first light source is modulated with code bits $c_{11}, c_{12},$ and $c_{13}$ and the light output of the second light source is modulated with code bits $c_{21}, c_{22},$ and $c_{23}$, the intensity $d_{x,y(1)}$ at each pixel (x,y) may be determined as follows:

$$d_{x,y(1)} = A_{x,y} \cdot c_{11} + A_{x,y} \cdot c_{12} + A_{x,y} \cdot c_{13} + B_{x,y} \cdot c_{21} + B_{x,y} \cdot c_{22} + B_{x,y} \cdot c_{23}, \quad (8)$$

where $A_{x,y}$ and $B_{x,y}$ represent similar values to those of the second scenario.

Again, the second image of the series of images of the scene is acquired during Frame 2 of the camera 410. Because the second image is taken when the light output of the first light source is modulated with the code bits $c_{12}, c_{13},$ and $c_{14}$ and the light output of the second light source is modulated with code bits $c_{22}, c_{23},$ and $c_{24}$, the intensity $d_{x,y(2)}$ at each pixel (x,y) may be determined as follows:

$$d_{x,y(2)} = A_{x,y} \cdot c_{12} + A_{x,y} \cdot c_{13} + A_{x,y} \cdot c_{14} + B_{x,y} \cdot c_{22} + B_{x,y} \cdot c_{23} + B_{x,y} \cdot c_{24}. \quad (9)$$

Similarly, for the third image, the intensity $d_{x,y(3)}$ at each pixel (x,y) may be determined as:

$$d_{x,y(3)} = A_{x,y} \cdot c_{13} + A_{x,y} \cdot c_{14} + A_{x,y} \cdot c_{11} + B_{x,y} \cdot c_{23} + B_{x,y} \cdot c_{24} + B_{x,y} \cdot c_{21}. \quad (10)$$

Finally, for the fourth image, the intensity $d_4$ at each pixel (x,y) may be determined as:

$$d_{x,y(4)} = A_{x,y} \cdot c_{14} + A_{x,y} \cdot c_{11} + A_{x,y} \cdot c_{12} + B_{x,y} \cdot c_{24} + B_{x,y} \cdot c_{21} + B_{x,y} \cdot c_{22}. \quad (11)$$

Similar to the third scenario, the above intensities (8)-(11) for a particular pixel (x,y) for the four acquired images may be written as a matrix intensity $\underline{d_{x,y}}$:

$$\underline{d_{x,y}} = A_{x,y} \underline{H} \cdot \underline{c_1} + B_{x,y} \underline{H} \cdot \underline{c_2} \quad (12)$$

where $$H = \begin{bmatrix} 1 & 1 & 1 & 0 \\ 0 & 1 & 1 & 1 \\ 1 & 0 & 1 & 1 \\ 1 & 1 & 0 & 1 \end{bmatrix}, \underline{c_1} = \begin{bmatrix} c_{11} \\ c_{12} \\ c_{13} \\ c_{14} \end{bmatrix}, \text{ and } \underline{c_2} = \begin{bmatrix} c_{21} \\ c_{22} \\ c_{23} \\ c_{24} \end{bmatrix}.$$

Similar to the third scenario, in formula (12), the processing unit 430 possesses the intensity $\underline{d_{x,y}}$ from the acquired series of images, the embedded codes $\underline{c_1}$ and $\underline{c_2}$—obtained in one of the manners described in association with FIG. 2, and H—from the way the camera 410 is configured to take the images. The processing unit 430 may determine the unknowns $A_{x,y}$ and $B_{x,y}$ as:

$$A_{x,y} = \underline{c_1}^T \cdot \underline{H}^{-1} \cdot \underline{d_{x,y}}, \quad (13)$$

$$B_{x,y} = \underline{c_2}^T \cdot \underline{H}^{-1} \cdot \underline{d_{x,y}}. \quad (14)$$

Performing the calculation according to formula (13) is equivalent to the processing unit 430 correlating a sequence of pixels (x,y) of the acquired series of images corresponding to the selected physical position with the first sequence of N symbols. Performing the calculation according to formula (14) is equivalent to the processing unit 430 correlating a sequence of pixels (x,y) of the acquired series of images corresponding to the selected physical position with the second sequence of N symbols. Similarly to as was described in the previous scenarios, as a result of the first correlation, a first correlation output is obtained, where the presence of a peak means that the light contribution of the first light source is present at the selected physical position within the scene and the magnitude of the peak is representative of the light contribution $A_{x,y}$ provided by the first light source to the selected position within the scene. As a result of the second correlation, a second correlation output is obtained, where the presence of a peak means that the light contribution of the second light source is present at the selected physical position within the scene and the magnitude of the peak is representative of the light contribution $B_{x,y}$ provided by the second light source to the selected position within the scene.

Again, similar correlation may be performed for other selected physical positions within the scene and the footprints of the first and second light sources within the scene may be determined as previously described.

All of the other discussions of the third scenario are applicable here and, therefore, are not repeated.

Scenarios 1-4 Summarized

Figure 11:
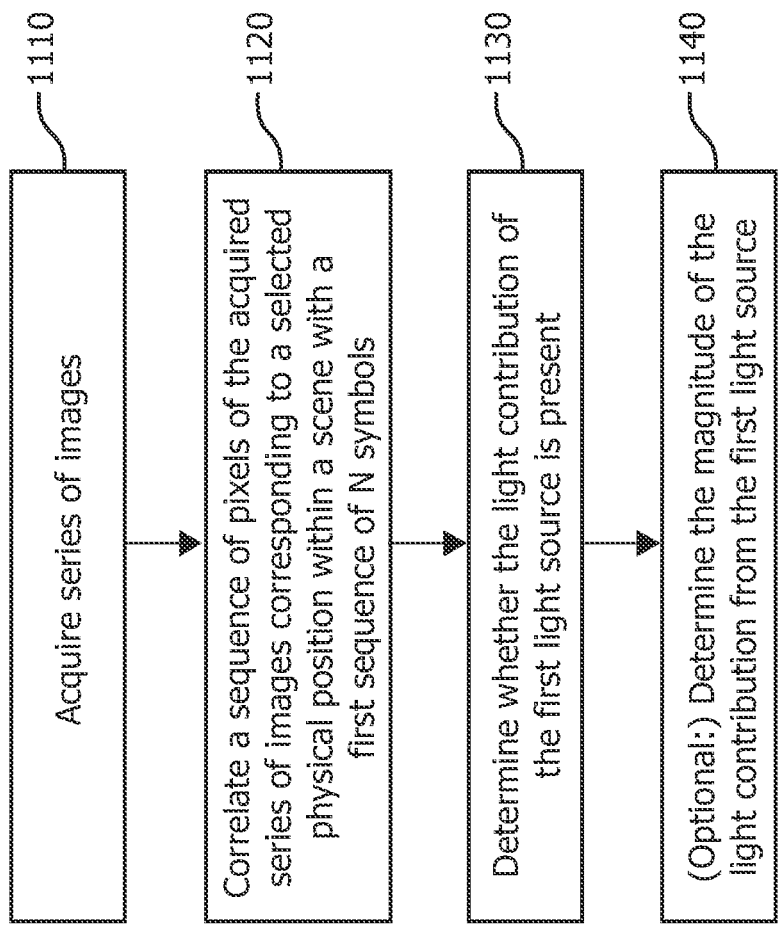
FIG. 11 is a flow diagram of method steps for determining whether a light contribution of a light source of the illumination system is present at a selected position within a scene, according to one embodiment of the present invention.

All of the scenarios described above may now be summarized. FIG. 11 is a flow diagram of method steps for determining whether a light contribution of a particular light source of the illumination system is present at a selected position within a scene, according to one embodiment of the present invention. While the method steps are described in conjunction with FIG. 4, persons skilled in the art will recognize that any system configured to perform the method steps, in any order, is within the scope of the present invention.

The method begins in step 1110, where the camera 410 acquires a series of images of the scene. As previously described herein, each acquired image includes a plurality of pixels, where each pixel represents an intensity of a total light output of the illumination system at a different physical position within the scene. The total light output if the illumination system includes the light contribution of the one or more light sources. The series of images comprises at least N different images. Each of these images is acquired with a total exposure time comprising one or more exposure instances at different temporal positions within the repeating sequence of N symbols. In this manner, all of the individual bits of the repeating sequences of the different light sources may be detected.

In step 1120, the processing unit 430 correlates a sequence of pixels of the acquired series of images corresponding to a selected physical position within a scene with the first sequence of N symbols, where the repeating first sequence is embedded into the light output of the first light source of the illumination system.

In step 1130, the processing unit 430 determines that the light contribution of the first light source is present at the selected physical position within the scene when the correlation of the sequence of pixels of the acquired series of images corresponding to the selected physical position with the first sequence of N symbols produces a correlation peak.

In the optional step 1140, the processing unit 430 may further use the correlation value of peak within the correlation output to estimate illumination contribution of the first light source. By repeating steps 1110-1140 for all of the remaining physical positions within the scene (i.e., for all pixels of the acquired series of images), a footprint of the first light source within the scene may be determined. By repeating steps 1110-1140 for all physical positions within the scene (i.e., for all pixels of the acquired series of images) for all light sources of the illumination system, footprints of the various light sources within the scene may be resolved.

One advantage of the present invention is that, based on the series of images acquired by choosing specific open/closure patterns of the shutter of a camera, coded light modulated at high frequency and, thus, invisible to the human eye, may be detected using a conventional low-rate camera. For example, a conventional 50 Hz camera may be used to determine coded light modulated at 1 kHz or higher, which is far above the human visibility threshold. Furthermore, the present detection system and methods allows identification of the embedded codes of the different light sources being present in a 2D scene.

While example embodiment illustrated herein are provided for synchronous illumination systems (i.e., the systems where the embedded codes of various light sources begin at the same time), persons skilled in the art will be able to extend the teachings of the present invention to asynchronous illumination systems (i.e., the systems where the embedded codes of various light sources begin at different times).

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. A detection system for determining whether a light contribution of a first light source of an illumination system is present at a selected position within a scene; wherein the light contribution of the first light source includes a first embedded code comprising a repeating first sequence of N symbols, the detection system comprising:
   a camera configured to acquire a series of images of the scene, wherein:
      each acquired image includes a plurality of pixels, each pixel representing an intensity of a total light output of the illumination system at a different physical position within the scene and the total light output of the illumination system comprising at least the light contribution of the first light source,
      the series comprises at least N different images, and
      each image of the at least N different images is acquired with a total exposure time comprising one or more exposure instances at different temporal positions within the repeating first sequence of N symbols; and
   a processing unit configured to process the acquired series of images to determine that the light contribution of the first light source is present at the selected physical position.

2. The detection system according to claim 1, wherein the processing of the acquired series of images to determine that the light contribution of the first light source is present at the selected physical position comprises:
   correlating a sequence of pixels of the acquired series of images corresponding to the selected physical position with the first sequence of N symbols, and determining that the light contribution of the first light source is present at the selected physical position when the correlation of the sequence of pixels of the acquired series of images corresponding to the selected physical position with the first sequence of N symbols produces a correlation peak.

3. The detection system according to claim 2, wherein, based on the correlation of the sequence of pixels of the acquired series of images corresponding to the selected physical position with the first sequence of N symbols, the processing unit is further configured to determine an intensity, or a derivative thereof, of the light contribution of the first light source at the selected physical position.

4. The detection system according to claim 1, wherein:
the illumination system further comprises a second light source;
a light contribution of the second light source includes a second embedded code comprising a repeating second sequence of N symbols;
the total light output of the illumination system further comprises the light contribution of the second light source; and
the processing unit is further configured to process the acquired series of images to determine that the light contribution of the second light source is present at the selected physical position.

5. The detection system according to claim 4, wherein the processing of the acquired series of images to determine that the light contribution of the second light source is present at the selected physical position comprises:
correlating the sequence of pixels of the acquired series of images corresponding to the selected physical position with the second sequence of N symbols, and
determining that the light contribution of the second light source is present at the selected physical position when the correlation of the sequence of pixels of the acquired series of images corresponding to the selected physical position with the second sequence of N symbols produces a correlation peak.

6. The detection system according to claim 4, wherein the selected physical position is included within a first part of the scene and the processing unit is further configured to:
for each acquired image, determine a sum of the pixels included in a part of the image corresponding to the first part of the scene,
correlate a sequence of the sums of the acquired series of images with the first sequence of N symbols, and
determine that the light contribution of the first light source is present within the first part of the scene when the correlation of the sequence of the image sums of the acquired series of images with the first sequence of N symbols produces at least one correlation peak above a first threshold value.

7. The detection system according to claim 6, wherein the processing unit is further configured to:
correlate the sequence of the sums of the acquired series of images with the second sequence of N symbols, and
determine that the light contribution of the second light source is present within the first part of the scene when the correlation of the sequence of the image sums of the acquired series of images with the second sequence of N symbols produces at least one correlation peak above a second threshold value.

8. The detection system according to claim 1, wherein the duration of each of the one or more exposure instances is equal to the duration of one symbol of the first sequence of N symbols.

9. The detection system according to claim 1, wherein the one or more exposure instances comprise a single exposure of two or more consecutive exposure instances.

10. The detection system according to claim 1, wherein the one or more exposure instances comprise two or more non-consecutive exposure instances.

11. A detection system for determining whether a light contribution of a first light source of an illumination system is present within a first part of a scene, wherein the light contribution of the first light source includes a first embedded code comprising a repeating first sequence of N symbols, the detection system comprising:
a camera configured to acquire a series of images of the scene, wherein:
each acquired image includes a plurality of pixels, each pixel representing an intensity of a total light output of the illumination system at a different physical position within the scene and the total light output of the illumination system comprising at least the light contribution of the first light source,
the series comprises at least N different images, and
each image of the at least N different images is acquired with a total exposure time comprising one or more exposure instances at different temporal positions within the repeating first sequence of N symbols; and
a processing unit configured to:
for each acquired image, determine a sum of the pixels included in a part of the image corresponding to the first part of the scene,
correlate a sequence of the sums of the acquired series of images with the first sequence of N symbols, and
determine that the light contribution of the first light source is present within the first part of the scene when the correlation of the sequence of the image sums of the acquired series of images with the first sequence of N symbols produces at least one correlation peak above a first threshold value.

12. A method for determining whether a light contribution of a first light source of an illumination system is present at a selected position within a scene, wherein the light contribution of the first light source includes a first embedded code comprising a repeating first sequence of N symbols, the method comprising:
acquiring a series of images of the scene, wherein:
each acquired image includes a plurality of pixels, each pixel representing an intensity of a total light output of the illumination system at a different physical position within the scene and the total light output of the illumination system comprising at least the light contribution of the first light source,
the series comprises at least N different images, and
each image of the at least N different images is acquired with a total exposure time comprising one or more exposure instances at different temporal positions within the repeating first sequence of N symbols; and
processing the acquired series of images to determine that the light contribution of the first light source is present at the selected physical position.

13. The method according to claim 12, wherein the processing of the acquired series of images to determine that the light contribution of the first light source is present at the selected physical position comprises:
correlating a sequence of pixels of the acquired series of images corresponding to the selected physical position with the first sequence of N symbols, and
determining that the light contribution of the first light source is present at the selected physical position when the correlation of the sequence of pixels of the acquired series of images corresponding to the selected physical position with the first sequence of N symbols produces a correlation peak.

14. A method for determining whether a light contribution of a first light source of an illumination system is present within a first part of a scene, wherein the light contribution of the first light source includes a first embedded code comprising a repeating first sequence of N symbols, the method comprising:

acquiring a series of images of the scene, wherein:
each acquired image includes a plurality of pixels, each pixel representing an intensity of a total light output of the illumination system at a different physical position within the scene and the total light output if the illumination system comprising at least the light contribution of the first light source,
the series comprises at least N different images, and
each image of the at least N different images is acquired with a total exposure time comprising one or more exposure instances at different temporal positions within the repeating first sequence of N symbols;

for each acquired image, determining a sum of the pixels included in a part of the image corresponding to the first part of the scene;

correlating a sequence of the sums of the acquired series of images with the first sequence of N symbols; and determining that the light contribution of the first light source is present within the first part of the scene when the correlation of the sequence of the image sums of the acquired series of images with the first sequence of N symbols produces at least one correlation peak above a first threshold value.

* * * * *